US011984131B2

(12) United States Patent
Adami et al.

(10) Patent No.: US 11,984,131 B2
(45) Date of Patent: *May 14, 2024

(54) CONCEPT FOR AUDIO ENCODING AND DECODING FOR AUDIO CHANNELS AND AUDIO OBJECTS

(71) Applicant: Fraunhofer-Gesellschaft zur Foerderung der angewandten Forschung e.V., Munich (DE)

(72) Inventors: Alexander Adami, Gundelsheim (DE); Christian Borss, Erlangen (DE); Sascha Dick, Nuremberg (DE); Christian Ertel, Eckental (DE); Simone Neukam, Kalchreuth (DE); Juergen Herre, Erlangen (DE); Johannes Hilpert, Nuremberg (DE); Andreas Hoelzer, Erlangen (DE); Michael Kratschmer, Erlangen (DE); Fabian Kuech, Fuerth (DE); Achim Kuntz, Erlangen (DE); Adrian Murtaza, Craiova (RO); Jan Plogsties, Fuerth (DE); Andreas Silzle, Buckenhof (DE); Hanne Stenzel, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,413

(22) Filed: Dec. 13, 2021

(65) Prior Publication Data

US 2022/0101867 A1 Mar. 31, 2022

Related U.S. Application Data

(63) Continuation of application No. 16/277,851, filed on Feb. 15, 2019, now Pat. No. 11,227,616, which is a
(Continued)

(30) Foreign Application Priority Data

Jul. 22, 2013 (EP) .................................... 13177378

(51) Int. Cl.
*G10L 19/20* (2013.01)
*G10L 19/008* (2013.01)
(Continued)

(52) U.S. Cl.
CPC ............ *G10L 19/20* (2013.01); *G10L 19/008* (2013.01); *G10L 19/028* (2013.01); *G10L 19/18* (2013.01);
(Continued)

(58) Field of Classification Search
CPC ............ G10L 19/0017; G10L 19/0018; G10L 19/002; G10L 19/005; G10L 19/008;
(Continued)

(56) References Cited

U.S. PATENT DOCUMENTS

| | | | |
|---|---|---|---|
| 2,605,361 | A | 7/1952 | Cutler |
| 7,979,282 | B2 | 7/2011 | Kim et al. |

(Continued)

FOREIGN PATENT DOCUMENTS

| | | | |
|---|---|---|---|
| CN | 1969317 | A | 5/2007 |
| CN | 101151660 | A | 3/2008 |

(Continued)

OTHER PUBLICATIONS

"Information technology—Generic Coding of Moving Pictures and Associated Audio Information", ISO/IEC 13818-7, MPEG-2 AAC 3rd edition, ISO/IEC JTC1/SC29/WG11 N6428, Mar. 2004, Mar. 2004, pp. 1-206.

(Continued)

*Primary Examiner* — Leshui Zhang
(74) *Attorney, Agent, or Firm* — Perkins Coie LLP; Michael A. Glenn

(57) ABSTRACT

Audio encoder for encoding audio input data to obtain audio output data includes an input interface for receiving a plurality of audio channels, a plurality of audio objects and
(Continued)

(DECODER)

metadata related to one or more of the plurality of audio objects; a mixer for mixing the plurality of objects and the plurality of channels to obtain a plurality of pre-mixed channels, each pre-mixed channel including audio data of a channel and audio data of at least one object; a core encoder for core encoding core encoder input data; and a metadata compressor for compressing the metadata related to the one or more of the plurality of audio objects, wherein the audio encoder is configured to operate in at least one mode of the group of two modes.

16 Claims, 10 Drawing Sheets

Related U.S. Application Data continuation of application No. 15/002,148, filed on Jan. 20, 2016, now Pat. No. 10,249,311, which is a continuation of application No. PCT/EP2014/065289, filed on Jul. 16, 2014.

(51) Int. Cl.

| | |
|---|---|
| ***G10L 19/028*** | (2013.01) |
| ***G10L 19/18*** | (2013.01) |
| ***G10L 19/22*** | (2013.01) |
| ***H04S 3/00*** | (2006.01) |

(52) U.S. Cl.

CPC .............. *G10L 19/22* (2013.01); *H04S 3/008* (2013.01); *H04S 2400/03* (2013.01); *H04S 2400/11* (2013.01)

(58) Field of Classification Search

CPC ............. G10L 19/0204; G10L 19/0216; G10L 19/028; G10L 19/03; G10L 19/097; G10L 19/13; G10L 19/167; G10L 19/173; G10L 19/18; G10L 19/20; G10L 19/22; G10L 21/0308; G10L 21/0364; G10L 21/057; G11B 2020/00021; G11B 2020/00028; G11B 2020/00036; G11B 2020/00043; G11B 2020/0005; G11B 2020/00057; G11B 2020/00065; H04S 1/00; H04S 1/002; H04S 1/007; H04S 3/006; H04S 3/008; H04S 3/02; H04S 3/00; H04S 5/005; H04S 5/02; H04S 2400/15; H04S 2400/09; H04S 2420/03; H04S 2420/11; H04S 5/00; H04R 5/00

USPC .... 381/1–23, 61, 63, 77, 78, 80, 81, 82, 85, 381/86, 123; 704/501, 504, E19.042, 704/E19.044, E19.048; 700/94

See application file for complete search history.

(56) References Cited

U.S. PATENT DOCUMENTS

| | | | | |
|---|---|---|---|---|
| 8,255,212 | B2 | 8/2012 | Villemoes | |
| 8,417,531 | B2 | 4/2013 | Kim et al. | |
| 8,504,184 | B2 | 8/2013 | Ishikawa et al. | |
| 8,504,377 | B2 | 8/2013 | Oh et al. | |
| 8,798,776 | B2 | 8/2014 | Schildbach et al. | |
| 8,824,688 | B2 | 9/2014 | Schreiner et al. | |
| 9,167,346 | B2 | 10/2015 | Kraemer et al. | |
| 9,530,421 | B2 | 12/2016 | Jot et al. | |
| 9,788,136 | B2 | 10/2017 | Borss et al. | |
| 2004/0028125 | A1 | 2/2004 | Sato | |
| 2006/0083385 | A1 | 4/2006 | Allamanche et al. | |
| 2006/0136229 | A1 | 6/2006 | Kjoerling et al. | |
| 2006/0165184 | A1 | 7/2006 | Purnhagen et al. | |
| 2007/0063877 | A1 | 3/2007 | Shmunk et al. | |
| 2007/0121954 | A1 | 5/2007 | Kim et al. | |
| 2007/0280485 | A1 | 12/2007 | Villemoes | |
| 2007/0291951 | A1 | 12/2007 | Faller | |
| 2008/0234845 | A1 | 9/2008 | Malvar et al. | |
| 2009/0006103 | A1 | 1/2009 | Koishida et al. | |
| 2009/0043591 | A1* | 2/2009 | Breebaart | G10L 21/00 704/500 |
| 2009/0125313 | A1 | 5/2009 | Hellmuth et al. | |
| 2009/0125314 | A1* | 5/2009 | Helimuth | G10L 19/00 704/501 |
| 2009/0210239 | A1 | 8/2009 | Yoon et al. | |
| 2009/0271015 | A1 | 10/2009 | Oh et al. | |
| 2009/0278995 | A1* | 11/2009 | Oh | G06F 17/00 348/731 |
| 2009/0326958 | A1 | 12/2009 | Kim et al. | |
| 2010/0014680 | A1 | 1/2010 | Oh et al. | |
| 2010/0017195 | A1 | 1/2010 | Villemoes | |
| 2010/0083344 | A1 | 4/2010 | Schildbach et al. | |
| 2010/0094631 | A1* | 4/2010 | Engdegard | G10L 19/008 704/258 |
| 2010/0121647 | A1 | 5/2010 | Beack et al. | |
| 2010/0135510 | A1* | 6/2010 | Yoo | G10L 19/008 381/300 |
| 2010/0153097 | A1 | 6/2010 | Hotho et al. | |
| 2010/0153118 | A1 | 6/2010 | Hotho et al. | |
| 2010/0174548 | A1 | 7/2010 | Beack et al. | |
| 2010/0191354 | A1 | 7/2010 | Oh et al. | |
| 2010/0202620 | A1 | 8/2010 | Oh et al. | |
| 2010/0211400 | A1 | 8/2010 | Oh et al. | |
| 2010/0226500 | A1 | 9/2010 | Wang et al. | |
| 2010/0262420 | A1 | 10/2010 | Herre et al. | |
| 2010/0310081 | A1* | 12/2010 | Lien | G10L 19/008 381/22 |
| 2010/0324915 | A1 | 12/2010 | Seo et al. | |
| 2011/0022402 | A1* | 1/2011 | Engdegard | G10L 19/20 704/501 |
| 2011/0029113 | A1 | 2/2011 | Ishikawa et al. | |
| 2011/0173006 | A1 | 7/2011 | Nagel et al. | |
| 2011/0182432 | A1 | 7/2011 | Ishikawa et al. | |
| 2011/0200198 | A1 | 8/2011 | Grill et al. | |
| 2011/0202355 | A1* | 8/2011 | Grill | G10L 19/173 704/500 |
| 2011/0238425 | A1* | 9/2011 | Neuendorf | G10L 19/008 704/500 |
| 2011/0293025 | A1 | 12/2011 | Mudulodu et al. | |
| 2011/0305344 | A1 | 12/2011 | Sole et al. | |
| 2012/0002818 | A1* | 1/2012 | Heiko | G10L 19/008 381/22 |
| 2012/0057715 | A1 | 3/2012 | Johnston et al. | |
| 2012/0062700 | A1 | 3/2012 | Antonellis et al. | |
| 2012/0093213 | A1 | 4/2012 | Moriya et al. | |
| 2012/0143613 | A1 | 6/2012 | Herre et al. | |
| 2012/0183162 | A1 | 7/2012 | Chabanne et al. | |
| 2012/0230497 | A1 | 9/2012 | Dressler et al. | |
| 2012/0243690 | A1 | 9/2012 | Engdegard et al. | |
| 2012/0269353 | A1 | 10/2012 | Herre et al. | |
| 2012/0294449 | A1 | 11/2012 | Beack et al. | |
| 2012/0308049 | A1 | 12/2012 | Schreiner et al. | |
| 2012/0314875 | A1* | 12/2012 | Lee | G10L 19/008 381/22 |
| 2012/0323584 | A1 | 12/2012 | Koishida et al. | |
| 2013/0013321 | A1 | 1/2013 | Oh et al. | |
| 2013/0110523 | A1 | 5/2013 | Beack et al. | |
| 2013/0132098 | A1 | 5/2013 | Beack et al. | |
| 2013/0246077 | A1 | 9/2013 | Riedmiller et al. | |
| 2014/0133682 | A1 | 5/2014 | Chabanne et al. | |
| 2014/0133683 | A1* | 5/2014 | Robinson | H04S 3/008 381/303 |
| 2014/0257824 | A1 | 9/2014 | Taleb et al. | |
| 2014/0350944 | A1* | 11/2014 | Jot | G10L 19/008 704/500 |
| 2016/0111099 | A1 | 4/2016 | Hirvonen et al. | |
| 2016/0133267 | A1 | 5/2016 | Adami et al. | |

FOREIGN PATENT DOCUMENTS

| | | |
|---|---|---|
| CN | 101288115 A | 10/2008 |
| CN | 101529501 A | 9/2009 |

(56) References Cited

FOREIGN PATENT DOCUMENTS

| | | | |
|---|---|---|---|
| CN | 101542595 | A | 9/2009 |
| CN | 101542596 | A | 9/2009 |
| CN | 101542597 | A | 9/2009 |
| CN | 101553865 | A | 10/2009 |
| CN | 101617360 | A | 12/2009 |
| CN | 101632118 | A | 1/2010 |
| CN | 101689368 | A | 3/2010 |
| CN | 101743586 | A | 6/2010 |
| CN | 101809654 | A | 8/2010 |
| CN | 101821799 | A | 9/2010 |
| CN | 101849257 | A | 9/2010 |
| CN | 101884227 | A | 11/2010 |
| CN | 101926181 | A | 12/2010 |
| CN | 101930741 | A | 12/2010 |
| CN | 102016981 | A | 4/2011 |
| CN | 102016982 | A | 4/2011 |
| CN | 102089816 | A | 6/2011 |
| CN | 102099856 | A | 6/2011 |
| CN | 102100088 | A | 6/2011 |
| CN | 102123341 | A | 7/2011 |
| CN | 102124517 | A | 7/2011 |
| CN | 102165520 | A | 8/2011 |
| CN | 102171754 | A | 8/2011 |
| CN | 102171755 | A | 8/2011 |
| CN | 102239520 | A | 11/2011 |
| CN | 102387005 | A | 3/2012 |
| CN | 102388417 | A | 3/2012 |
| CN | 102449689 | A | 5/2012 |
| CN | 102576532 | A | 7/2012 |
| CN | 102640213 | A | 8/2012 |
| CN | 102768836 | A | 11/2012 |
| CN | 102883257 | A | 1/2013 |
| CN | 102892070 | A | 1/2013 |
| CN | 102931969 | A | 2/2013 |
| CN | 102100088 | B | 10/2013 |
| CN | 105612577 | B | 10/2019 |
| EP | 2137726 | A1 | 12/2009 |
| EP | 2137824 | A1 | 12/2009 |
| EP | 2146522 | A1 | 1/2010 |
| EP | 2194527 | A2 | 6/2010 |
| EP | 2209328 | A1 | 7/2010 |
| EP | 2479750 | A1 | 7/2012 |
| EP | 2560161 | A1 | 2/2013 |
| GB | 2417866 | A | 3/2006 |
| JP | 2010521013 | A | 6/2010 |
| JP | 2010525403 | A | 7/2010 |
| JP | 2013506164 | A | 2/2013 |
| KR | 20080029940 | A | 4/2008 |
| KR | 20110002489 | A | 1/2011 |
| RU | 2339088 | C1 | 11/2008 |
| RU | 2406166 | C2 | 12/2010 |
| RU | 2411594 | C2 | 2/2011 |
| RU | 2439719 | C2 | 1/2012 |
| RU | 2449387 | C2 | 4/2012 |
| RU | 2483364 | C2 | 5/2013 |
| TW | 200813981 | A | 3/2008 |
| TW | 200828269 | A | 7/2008 |
| TW | 201010450 | A | 3/2010 |
| TW | 201027517 | A | 7/2010 |
| WO | 2006048204 | A1 | 5/2006 |
| WO | 2008039042 | A1 | 4/2008 |
| WO | 2008046531 | A1 | 4/2008 |
| WO | 2008078973 | A1 | 7/2008 |
| WO | 2008111770 | A1 | 9/2008 |
| WO | 2008111773 | A1 | 9/2008 |
| WO | 2008114982 | A1 | 9/2008 |
| WO | 2008131903 | A1 | 11/2008 |
| WO | 2009049895 | A1 | 4/2009 |
| WO | 2009049896 | A1 | 4/2009 |
| WO | 2010076040 | A1 | 7/2010 |
| WO | 2010105695 | A1 | 9/2010 |
| WO | 2010149700 | A1 | 12/2010 |
| WO | 2011020067 | A1 | 2/2011 |
| WO | 2011039195 | A1 | 4/2011 |
| WO | 2011102967 | A1 | 8/2011 |
| WO | 2012072804 | A1 | 6/2012 |
| WO | 2012075246 | A2 | 6/2012 |
| WO | 2012/125855 | A1 | 9/2012 |
| WO | 2012125855 | A1 | 9/2012 |
| WO | WO-2012125855 | A1 * | 9/2012 ............. G10L 19/00 |
| WO | 2013006325 | | 1/2013 |
| WO | 2013006325 | A1 | 1/2013 |
| WO | 2013006338 | A2 | 1/2013 |
| WO | 2013024085 | A1 | 2/2013 |
| WO | 2013064957 | A1 | 5/2013 |
| WO | 2013075753 | A1 | 5/2013 |
| WO | 2013006330 | A3 | 7/2013 |

OTHER PUBLICATIONS

Breebaart, Jeroen , et al., “Spatial Audio Object Coding (SAOC)—The Upcoming MPEG Standard on Parametric Object Based Audio Coding”, AES Convention 124; May 2008, AES, 60 East 42nd Street, Room 2520 New York 10165-2520, USA, pp. 1-15.

Engdegard, Jonas , et al., “Spatial Audio Object Coding (SAOC)—The Upcoming MPEG Standard on Parametric Object Based Audio Coding”, 124th AES Convention, Audio Engineering Society, Paper 7377, pp. 1-15, (2008).

Geier, Matthias , et al., “Object-based Audio Reproduction and the Audio Scene Description Format”, Organised Sound, vol. 15, No. 3, pp. 219-227.

Herre, J. , et al., “The Reference Model Architecture for MPEG Spatial Audio Coding”, AES 118th Convention, Convention paper 6447, Barcelona, Spain, 13 pp., (2005).

Herre, Jurgen , et al., “MPEG Spatial Audio Object Coding—The ISO/MPEG Standard for Efficient Coding of Interactive Audio Scenes”, J. Audio Eng. Soc. vol. 60, No. 9, pp. 655-673, (2012).

ISO/IEC , “MPEG audio technologies—Part 2: Spatial Audio Object Coding (SAOC)”, ISO/IEC JTC1/SC29/WG11 (MPEG) International Standard 23003-2., Oct. 1, 2010, pp. 1-130.

ISO/IEC 14496-3 , “Information technology—Coding of audio-visual objects/ Part 3: Audio”, ISO/IEC 2009, 2009, 1416 pp.

Peters, Nils , et al., “SpatDIF: Principles, Specification, and Examples”, Proceedings of the 9th Sound and Music Computing Conference, Copenhagen, Denmark, pp. SMC2012-500-SMC2012-505, (2012).

Peters, Nils , et al., “The Spatial Sound Description Interchange Format: Principles, Specification, and Examples”, Computer Music Journal, 37:1, XP055137982, DOI: 10.1162/COMJ_a_00167, Retrieved from the Internet: URL:http://www.mitpressjournals.org/doi/pdfplus/10.1162/COMJ_a_00167 [retrieved on Sep. 3, 2014], pp. 1-22.

Pulkki, Ville “Virtual Sound Source Positioning Using Vector Base Amplitude Panning”, Journal of Audio Eng. Soc. vol. 45, No. 6., pp. 456-466.

Ramer, Urs , “An Iterative Procedure”, Computer Graphics and Image, vol. 1, pp. 244-256.

Wright, Matthew , et al., “Open SoundControl: A New Protocol for Communicating with Sound Synthesizers”, Proceedings of the 1997 International Computer Music Conference, vol. 2013, No. 8, 5 pp.

“Extensible Markup Language (XML) 1.0 (Fifth Edition)”, World Wide Web Consortium [online], http://www.w3.org/TR/2008/REC-XML-20081126/ (printout of internet site on Jun. 23, 2016), Nov. 26, 2008, 35 pp.

“Information technology—Generic Coding of Moving Pictures and Associated Audio Information”, ISO/IEC 13818-7, MPEG-2 AAC 3rd edition, ISO/IEC JTC1/SC29/WG11 N6428, Mar. 2004, pp. 1-206.

“Information technology—Generic coding of moving pictures and associated audio information—Part 7: Advanced Audio Coding (AAC)”, ISO/IEC 13818-7, Part 7 MPEG-2AAC, Aug. 2003, 198 pp.

“Information technology—Generic coding of moving pictures and associated audio information—Part 7: Advanced Audio Coding (AAC)”, ISO/IEC 13818-7:2004(E), Third edition, Oct. 15, 2004, 206 pp.

“Information technology—MPEG audio technologies—Part 3: Unified speech and audio coding”, ISO/IEC FDIS 23003-3:2011(E), Sep. 20, 2011, 291 pp.

(56) References Cited

OTHER PUBLICATIONS

"International Standard ISO/IEC 14772-1:1997—The Virtual Reality Modeling Language (VRML), Part 1: Functional specification and UTF-8 encoding", http://tecfa.unige.ch/guides/vrml/vrml97/spec/, 1997, 2 pp.
"IT—Generic Coding of Moving Pictures and Associated Audio Information", ISO/IEC 13818-7. MPEG-2 AAC 3rd edition. ISO/IEC JTC1/SC29/WG11 N6428., Mar. 2004, pp. 1-206.
"Synchronized Multimedia Integration Language (SMIL 3.0)", URL: http://www.w3.org/TR/2008/REC-SMIL3-20081201/, Dec. 2008, 200 pp.
Chen, Chung Yuan, et al., "Dynamic Light Scattering of poly (vinyl alcohol)—borax aqueous solution near overlap concentration", Polymer Papers, vol. 38, No. 9., Elsevier Science Ltd., XP4058593A, 1997, pp. 2019-2025.
Douglas, David H, et al., "Algorithms for the Reduction of the Number of Points Required to Represent a Digitized Line or its Caricature", Cartographica: The International Journal for Geographic Information and Geovisualization 10.2, 1973, pp. 112-122.
Engdegard, et al., "Spatial Audio Object Coding (SAOC)—The Upcoming MPEG Standard on Parametric Object Based Audio Coding", Convention paper 7377, Presented at the 124th Convention May 17-20, 2008; Amsterdam, The Netherlands, XP-002541458, May 2008.
Engdegard, Jonas, et al., "Spatial Audio Object Coding (SAOC)—The Upcoming MPEG Standard on Parametric Object Based Audio Coding", 124th AES Convention, Audio Engineering Society, Paper 7377, May 2008, pp. 1-15.
Geier, Matthias, et al., "Object-based Audio Reproduction and the Audio Scene Description Format", Organised Sound, vol. 15, No. 3, pp. 219-227; Dec. 2010.
Herre, J., et al., "The Reference Model Architecture for MPEG Spatial Audio Coding", AES 118th Convention, Convention paper 6447, Barcelona, Spain, May 2005, 13 pp.
Herre, Jurgen, et al., "From SAC To SAOC—Recent Developments in Parametric Coding of Spatial Audio", Fraunhofer Institute for Integrated Circuits, Illusions in Sound, AES 22nd UK Conference 2007, Apr. 2007, pp. 12-1-12-8.
Herre, Jurgen, et al., "MPEG Spatial Audio Object Coding—The ISO/MPEG Standard for Efficient Coding of Interactive Audio Scenes", J. Audio Eng. Soc. vol. 60, No. 9, Sep. 2012, pp. 655-673.
Herre, Jurgen, et al., "MPEG Surround—the ISO/MPEG Standard for Efficient and Compatible Multi-Channel Audio Coding", AES Convention 122, Convention Paper 7084, XP040508156, New York, May 1, 2007, 24 pp.
Herre, Jurgen, et al., "New Concepts in Parametric Coding of Spatial Audio: From SAC to SAOC", IEEE International Conference on Multimedia and Expo; ISBN 978-1-4244-1016-3, Jul. 2007, pp. 1894-1897.
ISO/IEC 14496-3, "Information technology—Coding of audio-visual objects, Part 3 Audio", Proof Reference No. ISO/IEC 14496-3:2009(E), Fourth Edition, 2009, 1416 pp.
ITU-T, "Information technology—Generic coding of moving pictures and associated audio information: Systems", Series H: Audiovisual and Multimedia Systems; ITU-T Recommendation H.222.0, May 2012, 234 pp.
Peters, Nils, et al., "SpatDIF: Principles, Specification, and Examples", Jun. 28, 2013, 6 pp.
Peters, Nils, et al., "SpatDIF: Principles, Specification, and Examples", Proceedings of the 9th Sound and Music Computing Conference, Copenhagen, Denmark, pp. SMC2012-500-SMC2012-505, Jul. 2012.
Peters, Nils, et al., "The Spatial Sound Description Interchange Format: Principles, Specification, and Examples", Computer Music Journal, 37:1, XP055137982, DOI: 10.1162/COMJ_a_00167, Retrieved from the Internet: URL: http://www.mitpressjournals.org/doi/pdfplus/10.1162/COMJ_a_00167 [retrieved on Sep. 3, 2014], May 2013, pp. 1-22.
Pulkki, Ville, "Virtual Sound Source Positioning Using Vector Base Amplitude Panning", Journal of Audio Eng. Soc. vol. 45, No. 6., Jun. 1997, pp. 456-466.
Ramer, Urs, "An Iterative Procedure", Computer Graphics and Image, vol. 1, 1972, pp. 244-256.
Schmidt, Jurgen, et al., "New and Advanced Features for Audio Presentation in the MPEG-4 Standard", 116th AES Convention, Berlin, Germany, May 2004, pp. 1-13.
Sporer, Thomas, "Codierung räumlicher Audiosignale mit leichtgewichtigen Audio-Objekten", Proc. Annual Meeting of the German Audiological Society (DGA), Erlangen, Germany, Mar. 2012, 22 pp.
Wright, Matthew, et al., "Open SoundControl: A New Protocol for Communicating with Sound Synthesizers", Proceedings of the 1997 International Computer Music Conference, vol. 2013, No. 8, 1997, 5 pp.

* cited by examiner (ENCODER)

(DECODER)

(ENCODER)

FIG 4 (DECODER)

(ENCODER)

FIG 6 (DECODER)

| mode | encoder | decoder |
| --- | --- | --- |
| 1 | mixer bypassed | object processor not bypassed |
| 2 | mixer active | object processor bypassed |
| 3 | SAOC encoding only for objects | SAOC decoding only for objects |
| 4 | SAOC encoding for pre-rendered channels/ mixer active | SAOC decoding for pre-rendered objects (obj. proc. bypassed) |
| 5 | any mix of modes 1 to 4 | any mix of modes 1 to 4 |

FIG 7

CONCEPT FOR AUDIO ENCODING AND DECODING FOR AUDIO CHANNELS AND AUDIO OBJECTS

CROSS-REFERENCE TO RELATED APPLICATIONS

This application is a continuation of copending U.S. patent application Ser. No. 16/277,851, filed Feb. 15, 2019, which in turn is continuation of copending U.S. patent application Ser. No. 15/002,148 filed Jan. 20, 2016, which is a continuation of International Application No. PCT/EP2014/065289, filed Jul. 16, 2014, which is incorporated herein by reference in its entirety, and additionally claims priority from European Application No. EP 13177378.0, filed Jul. 22, 2013, which is also incorporated herein by reference in its entirety.

The present invention is related to audio encoding/decoding and, in particular, to spatial audio coding and spatial audio object coding.

BACKGROUND OF THE INVENTION

Spatial audio coding tools are well-known in the art and are, for example, standardized in the MPEG-surround standard. Spatial audio coding starts from original input channels such as five or seven channels which are identified by their placement in a reproduction setup, i.e., a left channel, a center channel, a right channel, a left surround channel, a right surround channel and a low frequency enhancement channel. A spatial audio encoder typically derives one or more downmix channels from the original channels and, additionally, derives parametric data relating to spatial cues such as interchannel level differences in the channel coherence values, interchannel phase differences, interchannel time differences, etc. The one or more downmix channels are transmitted together with the parametric side information indicating the spatial cues to a spatial audio decoder which decodes the downmix channel and the associated parametric data in order to finally obtain output channels which are an approximated version of the original input channels. The placement of the channels in the output setup is typically fixed and is, for example, a 5.1 format, a 7.1 format, etc.

Additionally, spatial audio object coding tools are well-known in the art and are standardized in the MPEG SAOC standard (SAOC=spatial audio object coding). In contrast to spatial audio coding starting from original channels, spatial audio object coding starts from audio objects which are not automatically dedicated for a certain rendering reproduction setup. Instead, the placement of the audio objects in the reproduction scene is flexible and can be determined by the user by inputting certain rendering information into a spatial audio object coding decoder. Alternatively or additionally, rendering information, i.e., information at which position in the reproduction setup a certain audio object is to be placed typically over time can be transmitted as additional side information or metadata. In order to obtain a certain data compression, a number of audio objects are encoded by an SAOC encoder which calculates, from the input objects, one or more transport channels by downmixing the objects in accordance with certain downmixing information. Furthermore, the SAOC encoder calculates parametric side information representing inter-object cues such as object level differences (OLD), object coherence values, etc. As in SAC (SAC=Spatial Audio Coding), the inter object parametric data is calculated for individual time/frequency tiles, i.e., for a certain frame of the audio signal comprising, for example, 1024 or 2048 samples, 24, 32, or 64, etc., frequency bands are considered so that, in the end, parametric data exists for each frame and each frequency band. As an example, when an audio piece has 20 frames and when each frame is subdivided into 32 frequency bands, then the number of time/frequency tiles is 640.

Up to now no flexible technology exists combining channel coding on the one hand and object coding on the other hand so that acceptable audio qualities at low bit rates are obtained.

SUMMARY

According to an embodiment, an audio decoder for decoding encoded audio data may have: an input interface configured for receiving the encoded audio data, the encoded audio data having either a plurality of encoded audio channels and a plurality of encoded audio objects and compressed metadata related to the plurality of audio objects, or a plurality of encoded audio channels without any encoded audio objects; a core decoder configured for decoding the plurality of encoded audio channels received by the input interface and the plurality of encoded audio objects received by the input interface to obtain a plurality of decoded audio channels and a plurality of decoded audio objects, when the encoded audio data has the plurality of encoded audio channels and the plurality of encoded audio objects and the compressed metadata related to the plurality of encoded audio objects, or decoding the plurality of encoded audio channels received by the input interface to obtain a plurality of decoded audio channels, when the encoded audio data has the plurality of encoded audio channels without any encoded audio objects; a metadata decompressor configured for decompressing the compressed metadata to obtain decompressed metadata, when the encoded audio data has the plurality of encoded audio channels and the plurality of encoded audio objects and the compressed metadata related to the plurality of encoded audio objects; an object processor configured for processing the plurality of decoded audio objects using the decompressed metadata and the plurality of decoded audio channels to obtain a number of output audio channels having audio data from the plurality of decoded audio objects and the plurality of decoded audio channels, when the encoded audio data has the plurality of encoded audio channels and the plurality of encoded audio objects and the compressed metadata related to the plurality of encoded audio objects; and a post-processor configured for converting the number of output audio channels into an output format, wherein the audio decoder is configured to either bypass the object processor and to feed the plurality of decoded audio channels as the output audio channels into the post-processor, when the encoded audio data has the plurality of encoded audio channels without any audio objects, or to feed the plurality of decoded audio objects and the plurality of decoded audio channels into the object processor, when the encoded audio data has the plurality of encoded audio channels and the plurality of encoded audio objects and the compressed metadata related to the plurality of encoded audio objects.

According to another embodiment, a method of decoding encoded audio data may have the steps of: receiving the encoded audio data, the encoded audio data having either a plurality of encoded audio channels and a plurality of encoded audio objects and compressed metadata related to the plurality of audio objects, or a plurality of encoded audio channels without any encoded audio objects; core decoding the encoded audio data to obtain a plurality of decoded audio channels and a plurality of decoded audio objects, when the encoded audio data has the plurality of encoded audio channels and the plurality of encoded audio objects and the compressed metadata related to the plurality of encoded audio objects, or the plurality of encoded audio channels to obtain a plurality of decoded audio channels, when the encoded audio data has the plurality of encoded audio channels without any encoded audio objects; decompressing the compressed metadata to obtain decompressed metadata, when the encoded audio data has the plurality of encoded audio channels and the plurality of encoded audio objects and the compressed metadata related to the plurality of encoded audio objects, processing the plurality of decoded audio objects using the decompressed metadata, and the plurality of decoded audio channels to obtain a number of output audio channels having audio data from the plurality of decoded audio objects and the plurality of decoded audio channels, when the encoded audio data has the plurality of encoded audio channels and the plurality of encoded audio objects and the compressed metadata related to the plurality of encoded audio objects; and converting the number of output audio channels into an output format, wherein, in the method of decoding the encoded audio data, either the processing the plurality of decoded audio objects is bypassed and the plurality of decoded audio channels obtained by the core decoding is fed, as the output audio channels, into the converting, when the encoded audio data has the plurality of encoded audio channels without any audio objects, or the plurality of decoded audio objects and the plurality of decoded audio channels obtained by the core decoding are fed into processing the plurality of decoded audio objects, when the encoded audio data has the plurality of encoded audio channels and the plurality of encoded audio objects and the compressed metadata related to the plurality of encoded audio objects.

Still another embodiment may have a non-transitory digital storage medium having stored thereon a computer program for performing a method of decoding encoded audio data having the steps of: receiving the encoded audio data, the encoded audio data having either a plurality of encoded audio channels and a plurality of encoded audio objects and compressed metadata related to the plurality of audio objects, or a plurality of encoded audio channels without any encoded audio objects; core decoding the encoded audio data to obtain a plurality of decoded audio channels and a plurality of decoded audio objects, when the encoded audio data has the plurality of encoded audio channels and the plurality of encoded audio objects and the compressed metadata related to the plurality of encoded audio objects, or the plurality of encoded audio channels to obtain a plurality of decoded audio channels, when the encoded audio data has the plurality of encoded audio channels without any encoded audio objects; decompressing the compressed metadata to obtain decompressed metadata, when the encoded audio data has the plurality of encoded audio channels and the plurality of encoded audio objects and the compressed metadata related to the plurality of encoded audio objects, processing the plurality of decoded audio objects using the decompressed metadata, and the plurality of decoded audio channels to obtain a number of output audio channels having audio data from the plurality of decoded audio objects and the plurality of decoded audio channels, when the encoded audio data has the plurality of encoded audio channels and the plurality of encoded audio objects and the compressed metadata related to the plurality of encoded audio objects; and converting the number of output audio channels into an output format, wherein, in the method of decoding the encoded audio data, either the processing the plurality of decoded audio objects is bypassed and the plurality of decoded audio channels obtained by the core decoding is fed, as the output audio channels, into the converting, when the encoded audio data has the plurality of encoded audio channels without any audio objects, or the plurality of decoded audio objects and the plurality of decoded audio channels obtained by the core decoding are fed into processing the plurality of decoded audio objects, when the encoded audio data has the plurality of encoded audio channels and the plurality of encoded audio objects and the compressed metadata related to the plurality of encoded audio objects, when said computer program is run by a computer.

The present invention is based on the finding that, for an optimum system being flexible on the one hand and providing a good compression efficiency at a good audio quality on the other hand is achieved by combining spatial audio coding, i.e., channel-based audio coding with spatial audio object coding, i.e., object based coding. In particular, providing a mixer for mixing the objects and the channels already on the encoder-side provides a good flexibility, particularly for low bit rate applications, since any object transmission can then be unnecessary or the number of objects to be transmitted can be reduced. On the other hand, flexibility may be useful so that the audio encoder can be controlled in two different modes, i.e., in the mode in which the objects are mixed with the channels before being core-encoded, while in the other mode the object data on the one hand and the channel data on the other hand are directly core-encoded without any mixing in between.

This makes sure that the user can either separate the processed objects and channels on the encoder-side so that a full flexibility is available on the decoder side but, at the price of an enhanced bit rate. On the other hand, when bit rate requirements are more stringent, then the present invention already allows to perform a mixing/pre-rendering on the encoder-side, i.e., that some or all audio objects are already mixed with the channels so that the core encoder only encodes channel data and any bits that may be used for transmitting audio object data either in the form of a downmix or in the form of parametric inter object data are not required.

On the decoder-side, the user has again high flexibility due to the fact that the same audio decoder allows the operation in two different modes, i.e., the first mode where individual or separate channel and object coding takes place and the decoder has the full flexibility to rendering the objects and mixing with the channel data. On the other hand, when a mixing/pre-rendering has already taken place on the encoder-side, the decoder is configured to perform a post processing without any intermediate object processing. On the other hand, the post processing can also be applied to the data in the other mode, i.e., when the object rendering/mixing takes place on the decoder-side. Thus, the present invention allows a framework of processing tasks which allows a great re-use of resources not only on the encoder side but also on the decoder side. The post-processing may refer to downmixing and binauralizing or any other processing to obtain a final channel scenario such as an intended reproduction layout.

Furthermore, in case of very low bit rate requirements, the present invention provides the user with enough flexibility to react to the low bit rate requirements, i.e., by pre-rendering on the encoder-side so that, for the price of some flexibility, nevertheless very good audio quality on the decoder-side is obtained due to the fact that the bits which have been saved by not providing any object data anymore from the encoder to the decoder can be used for better encoding the channel data such as by finer quantizing the channel data or by other means for improving the quality or for reducing the encoding loss when enough bits are available.

In a embodiment of the present invention, the encoder additionally comprises an SAOC encoder and furthermore allows to not only encode objects input into the encoder but to also SAOC encode channel data in order to obtain a good audio quality at even lower bit rates that may be used. Further embodiments of the present invention allow a post processing functionality which comprises a binaural renderer and/or a format converter. Furthermore, it is advantageous that the whole processing on the decoder side already takes place for a certain high number of loud speakers such as a 22 or 32 channel loudspeaker setup. However, then the format converter, for example, determines that only a 5.1 output, i.e., an output for a reproduction layout may be used which has a lower number than the maximum number of channels, then it is advantageous that the format converter controls either the USAC decoder or the SAOC decoder or both devices to restrict the core decoding operation and the SAOC decoding operation so that any channels which are, in the end, nevertheless down mixed into a format conversion are not generated in the decoding. Typically, the generation of upmixed channels may use decorrelation processing and each decorrelation processing introduces some level of artifacts. Therefore, by controlling the core decoder and/or the SAOC decoder by the output format that may finally be used, a great deal of additional decorrelation processing is saved compared to a situation when this interaction does not exist which not only results in an improved audio quality but also results in a reduced complexity of the decoder and, in the end, in a reduced power consumption which is particularly useful for mobile devices housing the inventive encoder or the inventive decoder. The inventive encoders/decoders, however, cannot only be introduced in mobile devices such as mobile phones, smart phones, notebook computers or navigation devices but can also be used in straightforward desktop computers or any other non-mobile appliances.

The above implementation, i.e. to not generate some channels, may be not optimum, since some information may be lost (such as the level difference between the channels that will be downmixed). This level difference information may not be critical, but may result in a different downmix output signal, if the downmix applies different downmix gains to the upmixed channels. An improved solution only switches off the decorrelation in the upmix, but still generates all upmix channels with correct level differences (as signalled by the parametric SAC). The second solution results in a better audio quality, but the first solution results in greater complexity reduction.

BRIEF DESCRIPTION OF THE DRAWINGS

Embodiments of the present invention will be detailed subsequently referring to the appended drawings, in which:

FIG. 7 illustrates a map indicating individual modes in which the encoders/decoders in accordance with embodiments of the present invention can be operated;

DETAILED DESCRIPTION OF THE INVENTION

Figure 1:
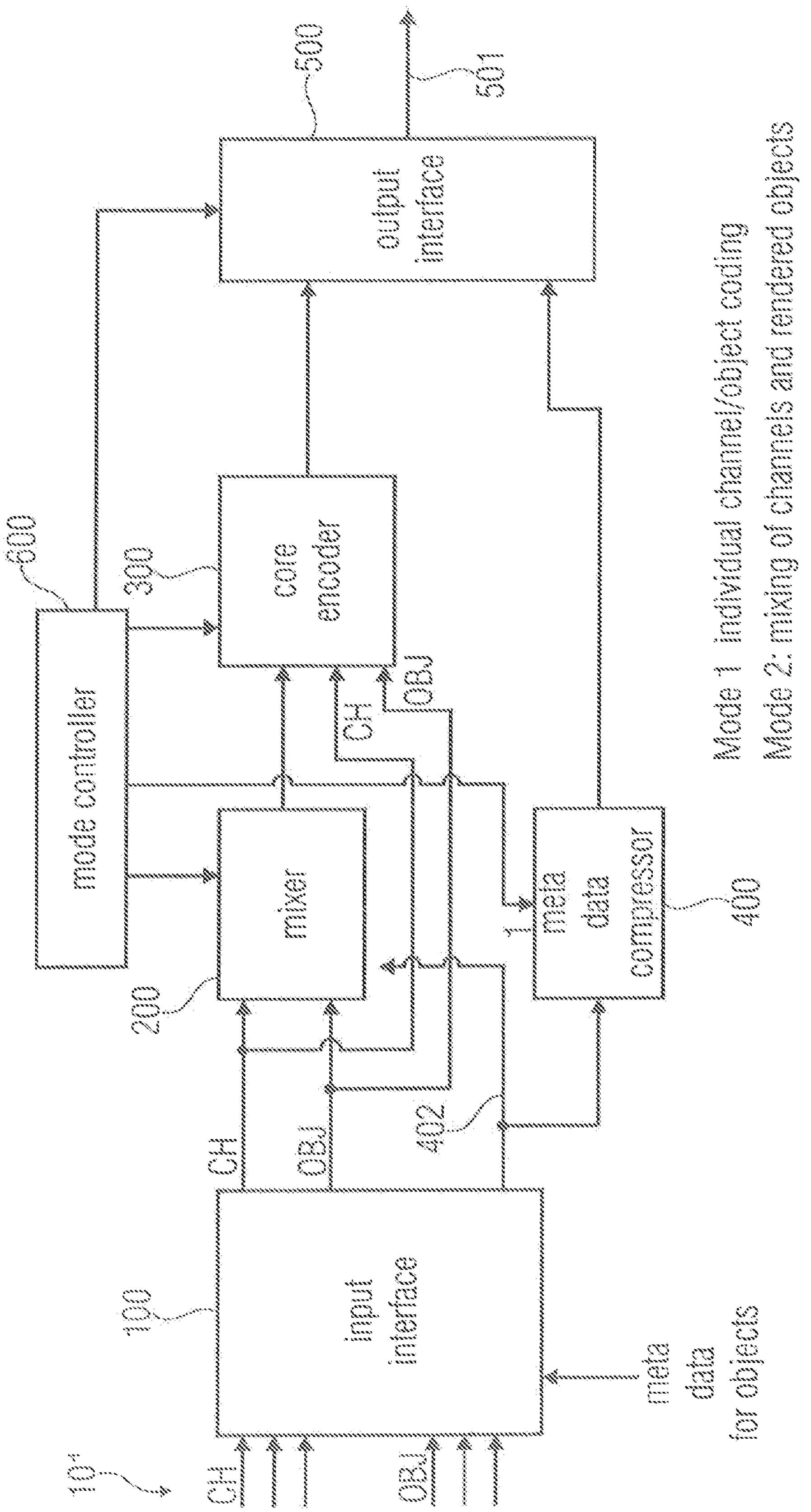
FIG. 1 illustrates a first embodiment of an encoder.

FIG. 1 illustrates an encoder in accordance with an embodiment of the present invention. The encoder is configured for encoding audio input data 101 to obtain audio output data 501. The encoder comprises an input interface for receiving a plurality of audio channels indicated by CH and a plurality of audio objects indicated by OBJ. Furthermore, as illustrated in FIG. 1, the input interface 100 additionally receives metadata related to one or more of the plurality of audio objects OBJ. Furthermore, the encoder comprises a mixer 200 for mixing the plurality of objects and the plurality of channels to obtain a plurality of pre-mixed channels, wherein each pre-mixed channel comprises audio data of a channel and audio data of at least one object.

Furthermore, the encoder comprises a core encoder 300 for core encoding core encoder input data, a metadata compressor 400 for compressing the metadata related to the one or more of the plurality of audio objects. Furthermore, the encoder can comprise a mode controller 600 for controlling the mixer, the core encoder and/or an output interface 500 in one of several operation modes, wherein in the first mode, the core encoder is configured to encode the plurality of audio channels and the plurality of audio objects received by the input interface 100 without any interaction by the mixer, i.e., without any mixing by the mixer 200. In a second mode, however, in which the mixer 200 was active, the core encoder encodes the plurality of mixed channels, i.e., the output generated by block 200. In this latter case, it is advantageous to not encode any object data anymore. Instead, the metadata indicating positions of the audio objects are already used by the mixer 200 to render the objects onto the channels as indicated by the metadata. In other words, the mixer 200 uses the metadata related to the plurality of audio objects to pre-render the audio objects and then the pre-rendered audio objects are mixed with the channels to obtain mixed channels at the output of the mixer. In this embodiment, any objects may not necessarily be transmitted and this also applies for compressed metadata as output by block 400. However, if not all objects input into the interface 100 are mixed but only a certain amount of objects is mixed, then only the remaining non-mixed objects and the associated metadata nevertheless are transmitted to the core encoder 300 or the metadata compressor 400, respectively.

Figure 3:
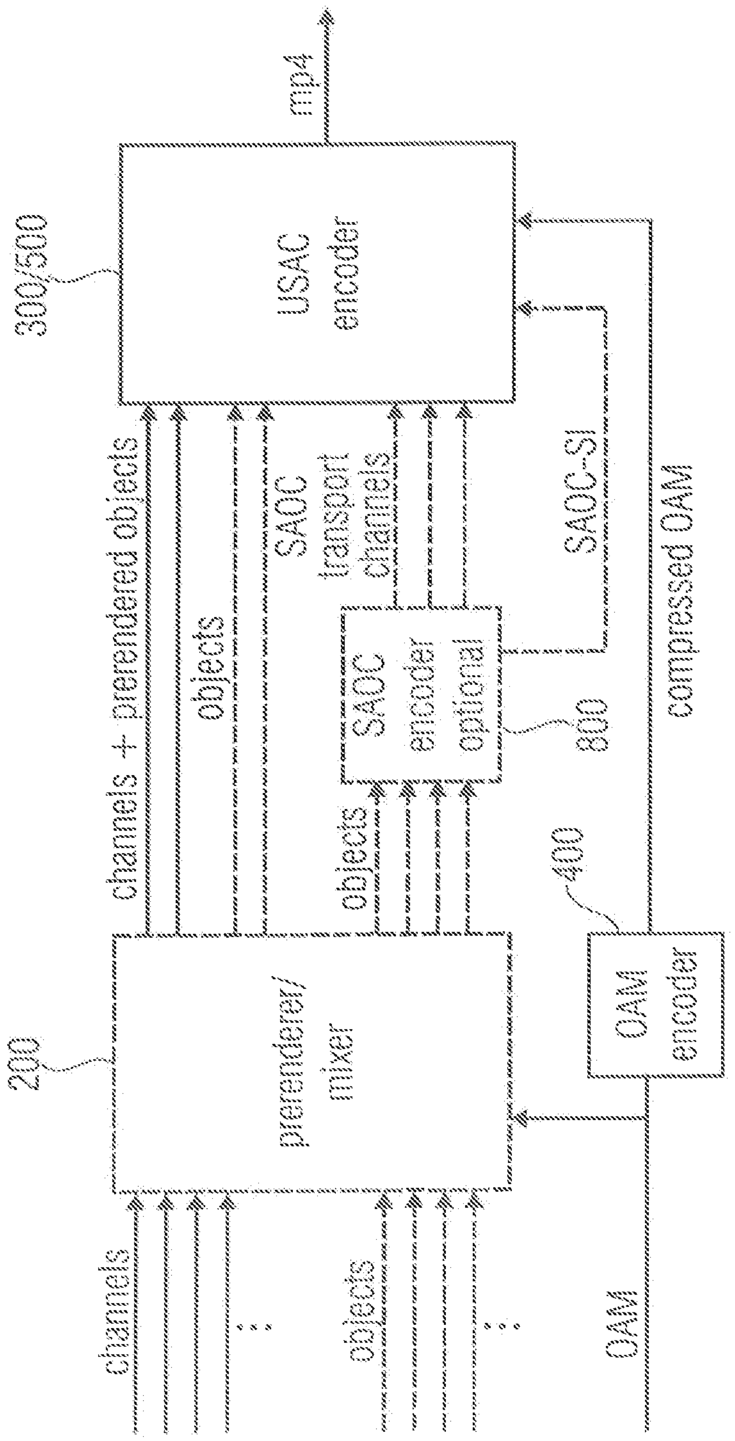
FIG. 3 illustrates a second embodiment of an encoder.

FIG. 3 illustrates a further embodiment of an encoder which, additionally, comprises an SAOC encoder 800. The SAOC encoder 800 is configured for generating one or more transport channels and parametric data from spatial audio object encoder input data. As illustrated in FIG. 3, the spatial audio object encoder input data are objects which have not been processed by the pre-renderer/mixer. Alternatively, provided that the pre-renderer/mixer has been bypassed as in the mode one where an individual channel/object coding is active, all objects input into the input interface 100 are encoded by the SAOC encoder 800.

Furthermore, as illustrated in FIG. 3, the core encoder 300 is advantageously implemented as a USAC encoder, i.e., as an encoder as defined and standardized in the MPEG-USAC standard (USAC=unified speech and audio coding). The output of the whole encoder illustrated in FIG. 3 is an MPEG 4 data stream having the container-like structures for individual data types. Furthermore, the metadata is indicated as "OAM" data and the metadata compressor 400 in FIG. 1 corresponds to the OAM encoder 400 to obtain compressed OAM data which are input into the USAC encoder 300 which, as can be seen in FIG. 3, additionally comprises the output interface to obtain the MP4 output data stream not only having the encoded channel/object data but also having the compressed OAM data.

Figure 5:
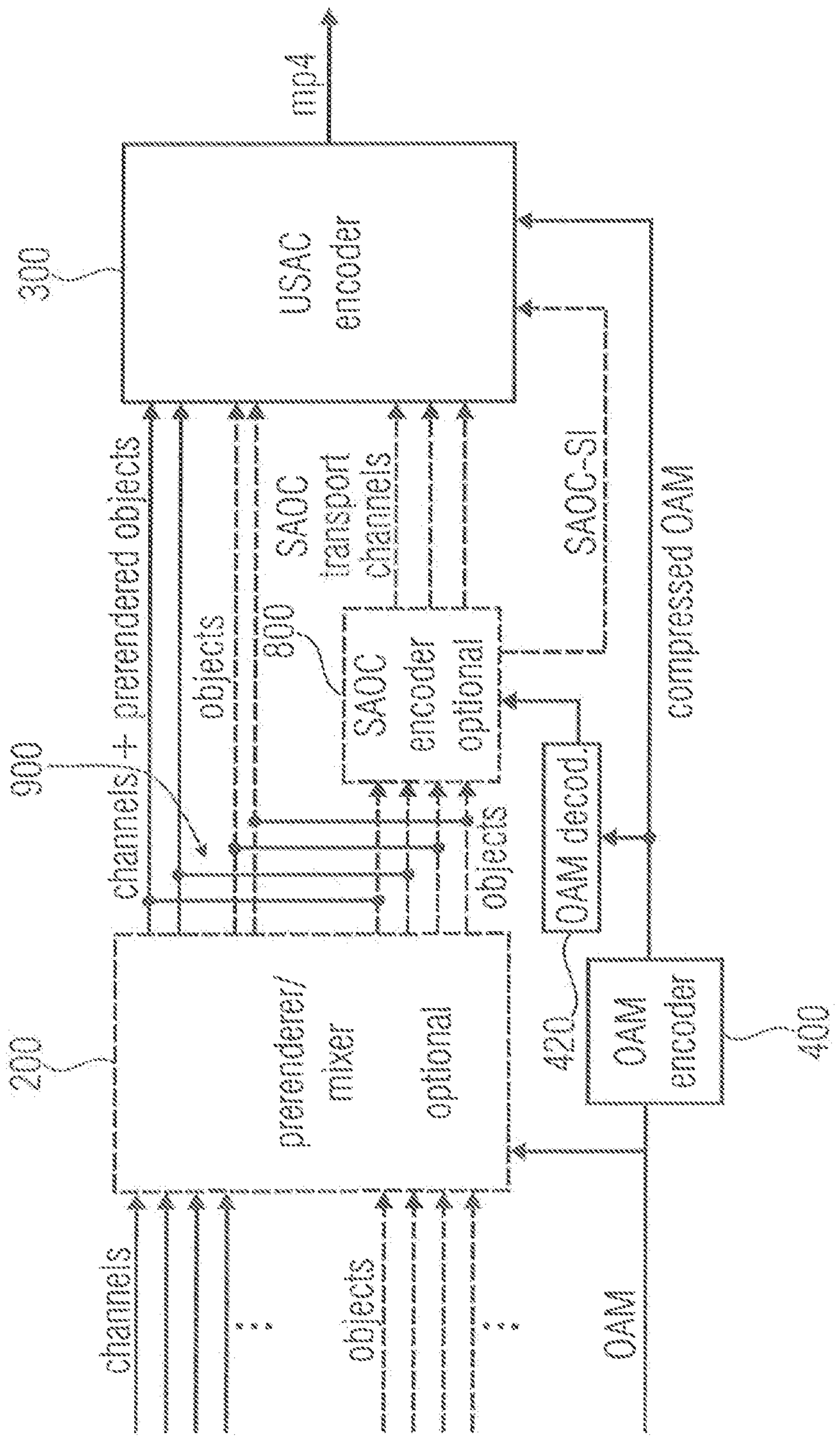
FIG. 5 illustrates a third embodiment of an encoder.

FIG. 5 illustrates a further embodiment of the encoder, where in contrast to FIG. 3, the SAOC encoder can be configured to either encode, with the SAOC encoding algorithm, the channels provided at the pre-renderer/mixer 200 not being active in this mode or, alternatively, to SAOC encode the pre-rendered channels plus objects. Thus, in FIG. 5, the SAOC encoder 800 can operate on three different kinds of input data, i.e., channels without any pre-rendered objects, channels and pre-rendered objects or objects alone. Furthermore, it is advantageous to provide an additional OAM decoder 420 in FIG. 5 so that the SAOC encoder 800 uses, for its processing, the same data as on the decoder side, i.e., data obtained by a lossy compression rather than the original OAM data.

The FIG. 5 encoder can operate in several individual modes.

In addition to the first and the second modes as discussed in the context of FIG. 1, the FIG. 5 encoder can additionally operate in a third mode in which the core encoder generates the one or more transport channels from the individual objects when the pre-renderer/mixer 200 was not active. Alternatively or additionally, in this third mode the SAOC encoder 800 can generate one or more alternative or additional transport channels from the original channels, i.e., again when the pre-renderer/mixer 200 corresponding to the mixer 200 of FIG. 1 was not active.

Finally, the SAOC encoder 800 can encode, when the encoder is configured in the fourth mode, the channels plus pre-rendered objects as generated by the pre-renderer/mixer. Thus, in the fourth mode the lowest bit rate applications will provide good quality due to the fact that the channels and objects have completely been transformed into individual SAOC transport channels and associated side information as indicated in FIGS. 3 and 5 as "SAOC-SI" and, additionally, any compressed metadata do not have to be transmitted in this fourth mode.

Figure 2:
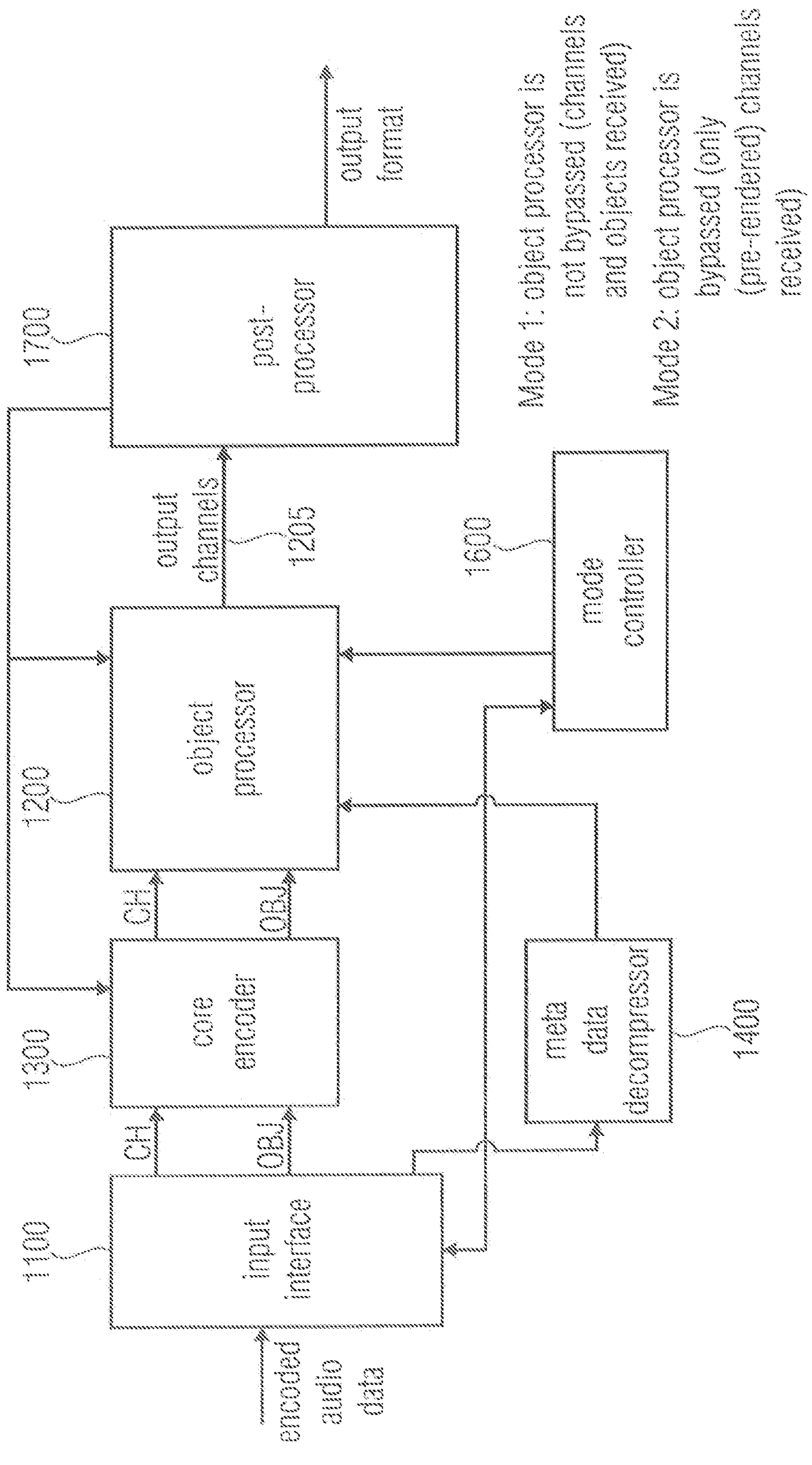
FIG. 2 illustrates a first embodiment of a decoder.

FIG. 2 illustrates a decoder in accordance with an embodiment of the present invention. The decoder receives, as an input, the encoded audio data, i.e., the data 501 of FIG. 1.

The decoder comprises a metadata decompressor 1400, a core decoder 1300, an object processor 1200, a mode controller 1600 and a postprocessor 1700.

Specifically, the audio decoder is configured for decoding encoded audio data and the input interface is configured for receiving the encoded audio data, the encoded audio data comprising a plurality of encoded channels and the plurality of encoded objects and compressed metadata related to the plurality of objects in a certain mode.

Furthermore, the core decoder 1300 is configured for decoding the plurality of encoded channels and the plurality of encoded objects and, additionally, the metadata decompressor is configured for decompressing the compressed metadata.

Furthermore, the object processor 1200 is configured for processing the plurality of decoded objects as generated by the core decoder 1300 using the decompressed metadata to obtain a predetermined number of output channels comprising object data and the decoded channels. These output channels as indicated at 1205 are then input into a postprocessor 1700. The postprocessor 1700 is configured for converting the number of output channels 1205 into a certain output format which can be a binaural output format or a loudspeaker output format such as a 5.1, 7.1, etc., output format.

Advantageously, the decoder comprises a mode controller 1600 which is configured for analyzing the encoded data to detect a mode indication. Therefore, the mode controller 1600 is connected to the input interface 1100 in FIG. 2. However, alternatively, the mode controller does not necessarily have to be there. Instead, the flexible decoder can be pre-set by any other kind of control data such as a user input or any other control. The audio decoder in FIG. 2 and, advantageously controlled by the mode controller 1600, is configured to either bypass the object processor and to feed the plurality of decoded channels into the postprocessor 1700. This is the operation in mode 2, i.e., in which only pre-rendered channels are received, i.e., when mode 2 has been applied in the encoder of FIG. 1. Alternatively, when mode 1 has been applied in the encoder, i.e., when the encoder has performed individual channel/object coding, then the object processor 1200 is not bypassed, but the plurality of decoded channels and the plurality of decoded objects are fed into the object processor 1200 together with decompressed metadata generated by the metadata decompressor 1400.

Advantageously, the indication whether mode 1 or mode 2 is to be applied is included in the encoded audio data and then the mode controller 1600 analyses the encoded data to detect a mode indication. Mode 1 is used when the mode indication indicates that the encoded audio data comprises encoded channels and encoded objects and mode 2 is applied when the mode indication indicates that the encoded audio data does not contain any audio objects, i.e., only contain pre-rendered channels obtained by mode 2 of the FIG. 1 encoder.

Figure 4:
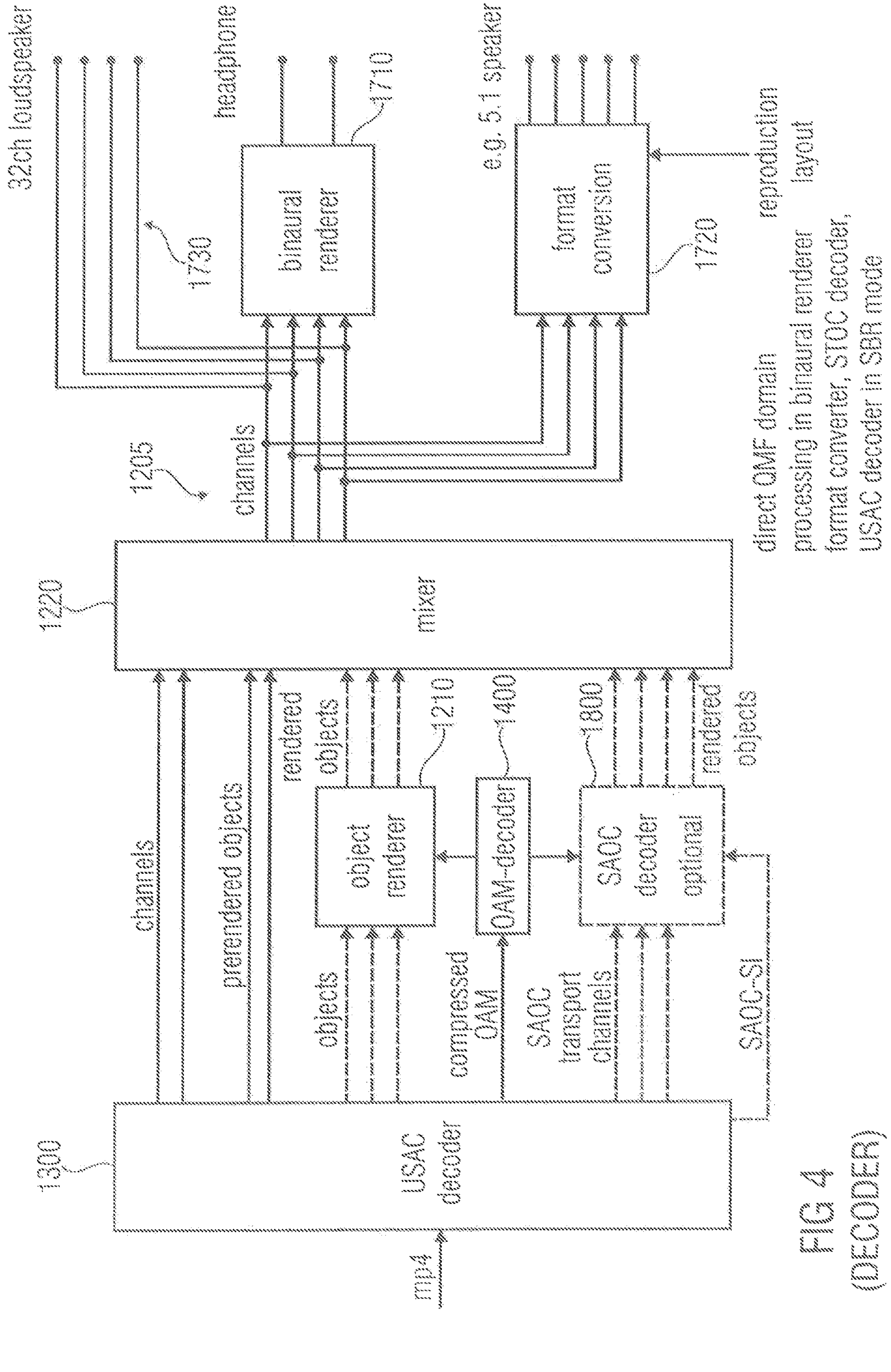
FIG. 4 illustrates a second embodiment of a decoder.

FIG. 4 illustrates a embodiment compared to the FIG. 2 decoder and the embodiment of FIG. 4 corresponds to the encoder of FIG. 3. In addition to the decoder implementation of FIG. 2, the decoder in FIG. 4 comprises an SAOC decoder 1800. Furthermore, the object processor 1200 of FIG. 2 is implemented as a separate object renderer 1210 and the mixer 1220 while, depending on the mode, the functionality of the object renderer 1210 can also be implemented by the SAOC decoder 1800.

Figure 6:
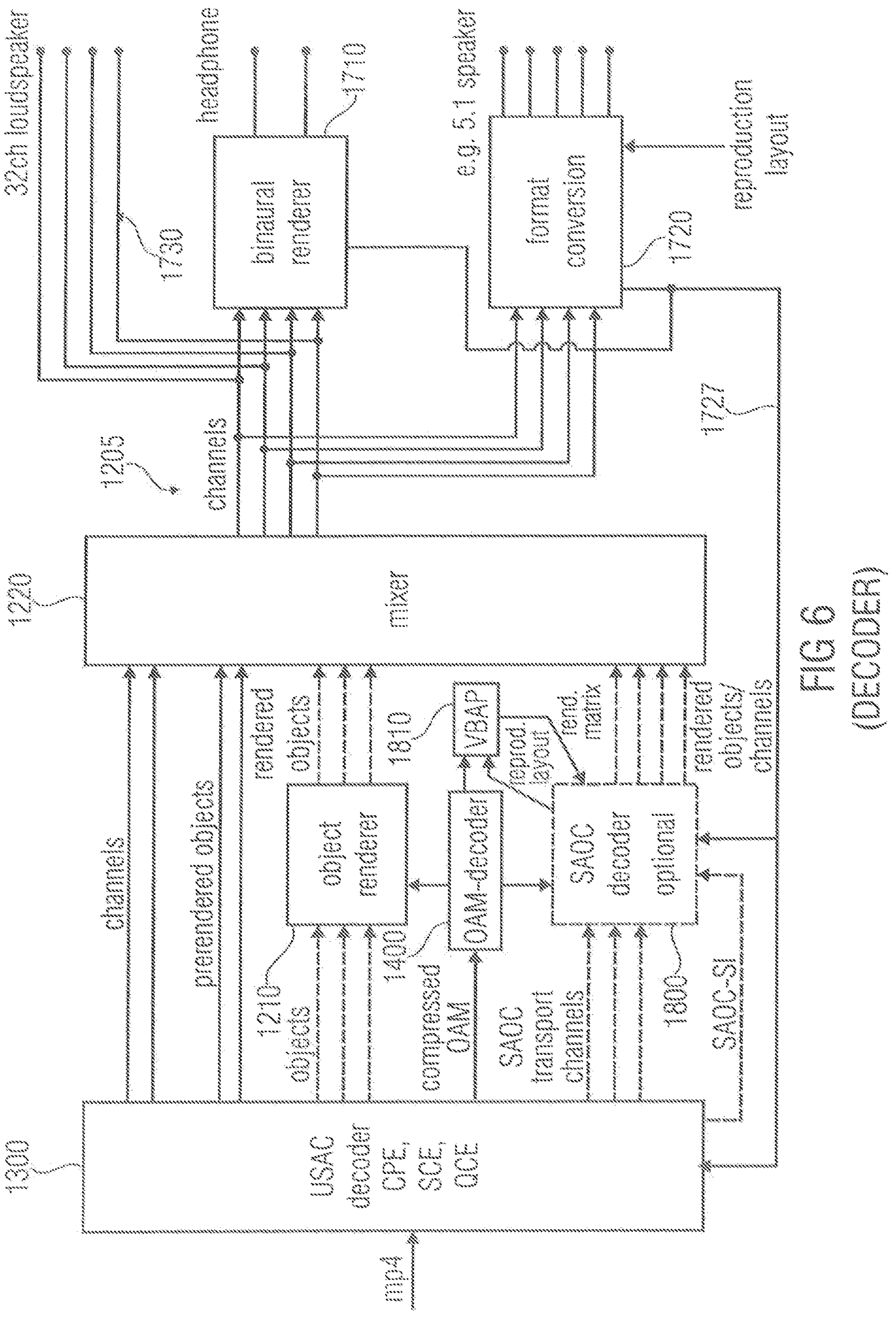
FIG. 6 illustrates a third embodiment of a decoder.

Furthermore, the postprocessor 1700 can be implemented as a binaural renderer 1710 or a format converter 1720. Alternatively, a direct output of data 1205 of FIG. 2 can also be implemented as illustrated by 1730. Therefore, it is advantageous to perform the processing in the decoder on the highest number of channels such as 22.2 or 32 in order to have flexibility and to then post-process if a smaller format may be useful. However, when it becomes clear from the very beginning that only small format such as a 5.1 format may be useful, then it is advantageous, as indicated by FIG. 2 or 6 by the shortcut 1727, that a certain control over the SAOC decoder and/or the USAC decoder can be applied in order to avoid unnecessary upmixing operations and subsequent downmixing operations.

In a embodiment of the present invention, the object processor 1200 comprises the SAOC decoder 1800 and the SAOC decoder is configured for decoding one or more transport channels output by the core decoder and associated parametric data and using decompressed metadata to obtain the plurality of rendered audio objects. To this end, the OAM output is connected to box 1800.

Furthermore, the object processor 1200 is configured to render decoded objects output by the core decoder which are not encoded in SAOC transport channels but which are individually encoded in typically single channeled elements as indicated by the object renderer 1210.

Furthermore, the decoder comprises an output interface corresponding to the output 1730 for outputting an output of the mixer to the loudspeakers.

In a further embodiment, the object processor 1200 comprises a spatial audio object coding decoder 1800 for decoding one or more transport channels and associated parametric side information representing encoded audio objects or encoded audio channels, wherein the spatial audio object coding decoder is configured to transcode the associated parametric information and the decompressed metadata into transcoded parametric side information usable for directly rendering the output format, as for example defined in an earlier version of SAOC. The postprocessor 1700 is configured for calculating audio channels of the output format using the decoded transport channels and the transcoded parametric side information. The processing performed by the post processor can be similar to the MPEG Surround processing or can be any other processing such as BCC processing or so.

In a further embodiment, the object processor 1200 comprises a spatial audio object coding decoder 1800 configured to directly upmix and render channel signals for the output format using the decoded (by the core decoder) transport channels and the parametric side information Furthermore, and importantly, the object processor 1200 of FIG. 2 additionally comprises the mixer 1220 which receives, as an input, data output by the USAC decoder 1300 directly when pre-rendered objects mixed with channels exist, i.e., when the mixer 200 of FIG. 1 was active. Additionally, the mixer 1220 receives data from the object renderer performing object rendering without SAOC decoding. Furthermore, the mixer receives SAOC decoder output data, i.e., SAOC rendered objects.

The mixer 1220 is connected to the output interface 1730, the binaural renderer 1710 and the format converter 1720. The binaural renderer 1710 is configured for rendering the output channels into two binaural channels using head related transfer functions or binaural room impulse responses (BRIR). The format converter 1720 is configured for converting the output channels into an output format having a lower number of channels than the output channels 1205 of the mixer and the format converter 1720 may use information on the reproduction layout such as 5.1 speakers or so.

The FIG. 6 decoder is different from the FIG. 4 decoder in that the SAOC decoder cannot only generate rendered objects but also rendered channels and this is the case when the FIG. 5 encoder has been used and the connection 900 between the channels/pre-rendered objects and the SAOC encoder 800 input interface is active.

Furthermore, a vector base amplitude panning (VBAP) stage 1810 is configured which receives, from the SAOC decoder, information on the reproduction layout and which outputs a rendering matrix to the SAOC decoder so that the SAOC decoder can, in the end, provide rendered channels without any further operation of the mixer in the high channel format of 1205, i.e., 32 loudspeakers.

the VBAP block advantageously receives the decoded OAM data to derive the rendering matrices. More general, it may use geometric information not only of the reproduction layout but also of the positions where the input signals should be rendered to on the reproduction layout. This geometric input data can be OAM data for objects or channel position information for channels that have been transmitted using SAOC.

However, if only a specific output interface may be used then the VBAP state 1810 can already provide the rendering matrix that may be used for the e.g., 5.1 output. The SAOC decoder 1800 then performs a direct rendering from the SAOC transport channels, the associated parametric data and decompressed metadata, a direct rendering into the output format that may be used without any interaction of the mixer 1220. However, when a certain mix between modes is applied, i.e., where several channels are SAOC encoded but not all channels are SAOC encoded or where several objects are SAOC encoded but not all objects are SAOC encoded or when only a certain amount of pre-rendered objects with channels are SAOC decoded and remaining channels are not SAOC processed then the mixer will put together the data from the individual input portions, i.e., directly from the core decoder 1300, from the object renderer 1210 and from the SAOC decoder 1800.

Subsequently, FIG. 7 is discussed for indicating certain encoder/decoder modes which can be applied by the inventive highly flexible and high quality audio encoder/decoder concept.

In accordance with the first coding mode, the mixer 200 in the FIG. 1 encoder is bypassed and, therefore, the object processor in the FIG. 2 decoder is not bypassed.

In the second mode, the mixer 200 in FIG. 1 is active and the object processor in FIG. 2 is bypassed.

Then, in the third coding mode, the SAOC encoder of FIG. 3 is active but only SAOC encodes the objects rather than channels or channels as output by the mixer. Therefore, mode 3 may use that, on the decoder side illustrated in FIG. 4, the SAOC decoder is only active for objects and generates rendered objects.

In a fourth coding mode as illustrated in FIG. 5, the SAOC encoder is configured for SAOC encoding pre-rendered channels, i.e., the mixer is active as in the second mode. On the decoder side, the SAOC decoding is preformed for pre-rendered objects so that the object processor is bypassed as in the second coding mode.

Furthermore, a fifth coding mode exists which can by any mix of modes 1 to 4. In particular, a mix coding mode will exist when the mixer 1220 in FIG. 6 receives channels directly from the USAC decoder and, additionally, receives channels with pre-rendered objects from the USAC decoder. Furthermore, in this mixed coding mode, objects are encoded directly using, advantageously, a single channel element of the USAC decoder. In this context, the object renderer 1210 will then render these decoded objects and forward them to the mixer 1220. Furthermore, several objects are additionally encoded by an SAOC encoder so that the SAOC decoder will output rendered objects to the mixer and/or rendered channels when several channels encoded by SAOC technology exist.

Each input portion of the mixer 1220 can then, exemplarily, have at least a potential for receiving the number of channels such as 32 as indicated at 1205. Thus, basically, the mixer could receive 32 channels from the USAC decoder and, additionally, 32 pre-rendered/mixed channels from the USAC decoder and, additionally, 32 "channels" from the object renderer and, additionally, 32 "channels" from the SAOC decoder, where each "channel" between blocks 1210 and 1218 on the one hand and block 1220 on the other hand has a contribution of the corresponding objects in a corresponding loudspeaker channel and then the mixer 1220 mixes, i.e., adds up the individual contributions for each loudspeaker channel.

In a embodiment of the present invention, the encoding/decoding system is based on an MPEG-D USAC codec for coding of channel and object signals. To increase the efficiency for coding a large amount of objects, MPEG SAOC technology has been adapted. Three types of renderers perform the task of rendering objects to channels, rendering channels to headphones or rendering channels to a different loudspeaker setup. When object signals are explicitly transmitted or parametrically encoded using SAOC, the corresponding object metadata information is compressed and multiplexed into the encoded output data.

In an embodiment, the pre-renderer/mixer 200 is used to convert a channel plus object input scene into a channel scene before encoding. Functionally, it is identical to the object renderer/mixer combination on the decoder side as illustrated in FIG. 4 or FIG. 6 and as indicated by the object processor 1200 of FIG. 2. Pre-rendering of objects ensures a deterministic signal entropy at the encoder input that is basically independent of the number of simultaneously active object signals. With pre-rendering of objects, no object metadata transmission may be used. Discrete object signals are rendered to the channel layout that the encoder is configured to use. The weights of the objects for each channel are obtained from the associated object metadata OAM as indicated by arrow 402.

Figure 10:
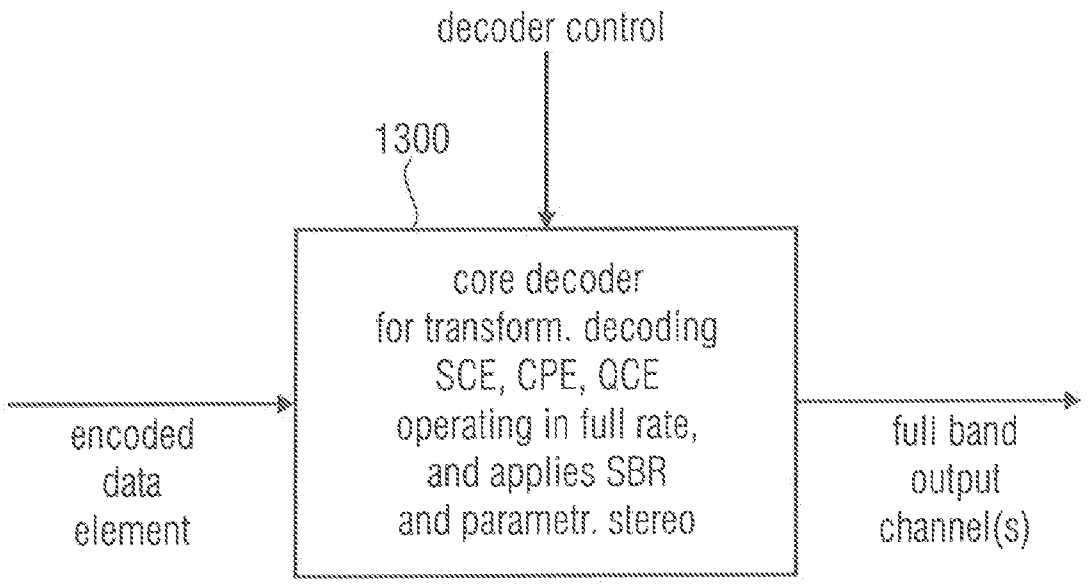
FIG. 10 illustrates a specific implementation of the core decoder.

As a core/encoder/decoder for loudspeaker channel signals, discrete object signals, object downmix signals and pre-rendered signals, a USAC technology is advantageous. It handles the coding of the multitude of signals by creating channel and object mapping information (the geometric and semantic information of the input channel and object assignment). This mapping information describes how input channels and objects are mapped to USAC channel elements as illustrated in FIG. 10, i.e., channel pair elements (CPEs), single channel elements (SCEs), channel quad elements (QCEs) and the corresponding information is transmitted to the core decoder from the core encoder. All additional payloads like SAOC data or object metadata have been passed through extension elements and have been considered in the encoder's rate control.

The coding of objects is possible in different ways, depending on the rate/distortion requirements and the interactivity requirements for the renderer. The following object coding variants are possible:

- Prerendered objects: Object signals are prerendered and mixed to the 22.2 channel signals before encoding. The subsequent coding chain sees 22.2 channel signals.
- Discrete object waveforms: Objects are supplied as monophonic waveforms to the encoder. The encoder uses single channel elements SCEs to transmit the objects in addition to the channel signals. The decoded objects are rendered and mixed at the receiver side. Compressed object metadata information is transmitted to the receiver/renderer alongside.
- Parametric object waveforms: Object properties and their relation to each other are described by means of SAOC parameters. The down-mix of the object signals is coded with USAC. The parametric information is transmitted alongside. The number of downmix channels is chosen depending on the number of objects and the overall data rate. Compressed object metadata information is transmitted to the SAOC renderer.

The SAOC encoder and decoder for object signals are based on MPEG SAOC technology. The system is capable of recreating, modifying and rendering a number of audio objects based on a smaller number of transmitted channels and additional parametric data (OLDs, IOCs (Inter Object Coherence), DMGs (Down Mix Gains)). The additional parametric data exhibits a significantly lower data rate than that may be used for transmitting all objects individually, making the coding very efficient.

The SAOC encoder takes as input the object/channel signals as monophonic waveforms and outputs the parametric information (which is packed into the 3D-Audio bitstream) and the SAOC transport channels (which are encoded using single channel elements and transmitted).

The SAOC decoder reconstructs the object/channel signals from the decoded SAOC transport channels and parametric information, and generates the output audio scene based on the reproduction layout, the decompressed object metadata information and optionally on the user interaction information.

For each object, the associated metadata that specifies the geometrical position and volume of the object in 3D space is efficiently coded by quantization of the object properties in time and space. The compressed object metadata cOAM is transmitted to the receiver as side information. The volume of the object may comprise information on a spatial extent and/or information of the signal level of the audio signal of this audio object.

The object renderer utilizes the compressed object metadata to generate object waveforms according to the given reproduction format. Each object is rendered to certain output channels according to its metadata. The output of this block results from the sum of the partial results.

If both channel based content as well as discrete/parametric objects are decoded, the channel based waveforms and the rendered object waveforms are mixed before outputting the resulting waveforms (or before feeding them to a postprocessor module like the binaural renderer or the loudspeaker renderer module).

The binaural renderer module produces a binaural downmix of the multichannel audio material, such that each input channel is represented by a virtual sound source. The processing is conducted frame-wise in QMF (Quadrature Mirror Filterbank) domain.

The binauralization is based on measured binaural room impulse responses

Figure 8:
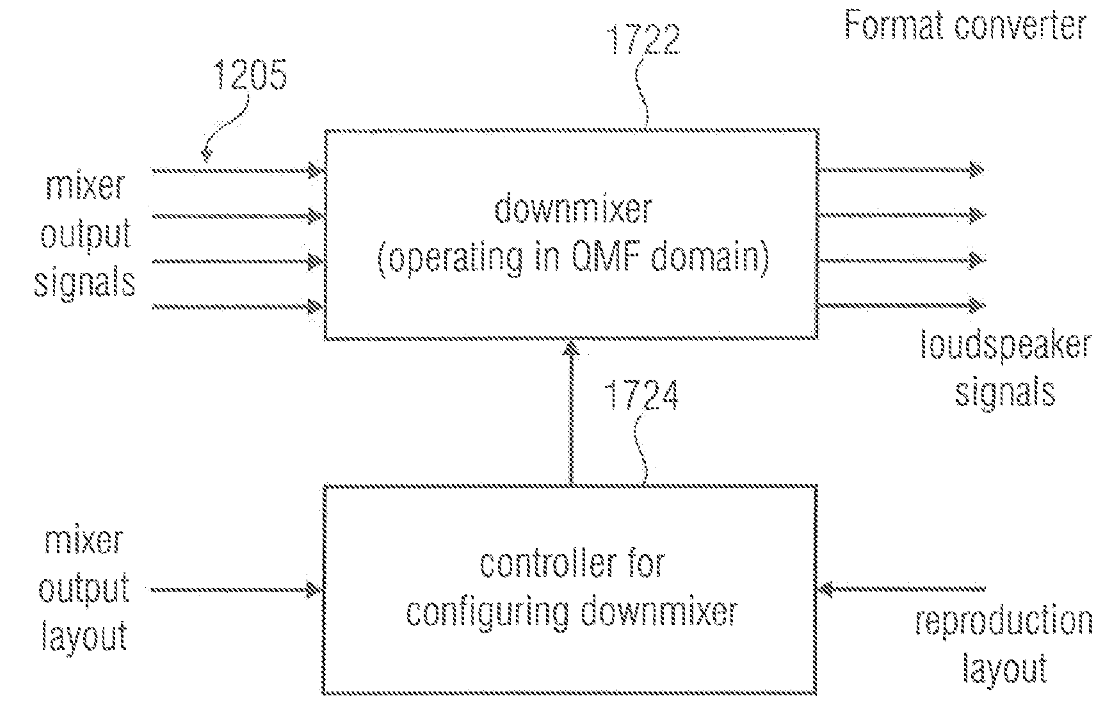
FIG. 8 illustrates a specific implementation of the format converter.

FIG. 8 illustrates a embodiment of the format converter 1720. The loudspeaker renderer or format converter converts between the transmitter channel configuration and the desired reproduction format. This format converter performs conversions to lower number of output channels, i.e., it creates downmixes. To this end, a downmixer 1722 which advantageously operates in the QMF domain receives mixer output signals 1205 and outputs loudspeaker signals. Advantageously, a controller 1724 for configuring the downmixer 1722 is provided which receives, as a control input, a mixer output layout, i.e., the layout for which data 1205 is determined and a desired reproduction layout is typically been input into the format conversion block 1720 illustrated in FIG. 6. Based on this information, the controller 1724 advantageously automatically generates optimized downmix matrices for the given combination of input and output formats and applies these matrices in the downmixer block 1722 in the downmix process. The format converter allows for standard loudspeaker configurations as well as for random configurations with non-standard loudspeaker positions.

As illustrated in the context of FIG. 6, the SAOC decoder is designed to render to the predefined channel layout such as 22.2 with a subsequent format conversion to the target reproduction layout. Alternatively, however, the SAOC decoder is implemented to support the "low power" mode where the SAOC decoder is configured to decode to the reproduction layout directly without the subsequent format conversion. In this implementation, the SAOC decoder 1800 directly outputs the loudspeaker signal such a the 5.1 loudspeaker signals and the SAOC decoder 1800 may use the reproduction layout information and the rendering matrix so that the vector base amplitude panning or any other kind of processor for generating downmix information can operate.

Figure 9:
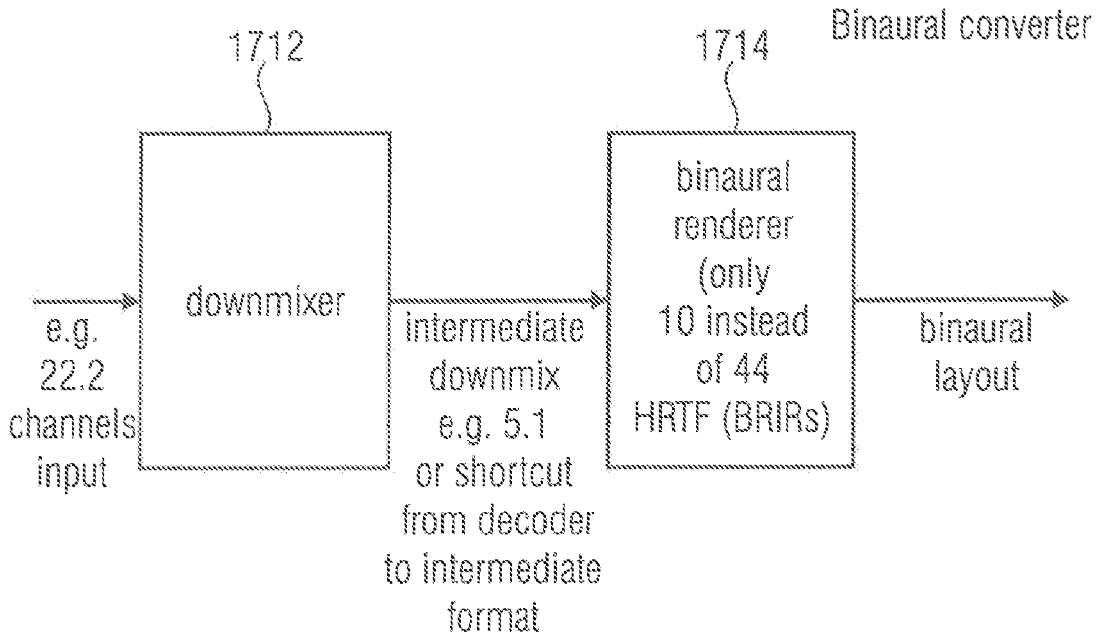
FIG. 9 illustrates a specific implementation of the binaural converter.

FIG. 9 illustrates a further embodiment of the binaural renderer 1710 of FIG. 6. Specifically, for mobile devices the binaural rendering may be used for headphones attached to such mobile devices or for loudspeakers directly attached to typically small mobile devices. For such mobile devices, constraints may exist to limit the decoder and rendering complexity. In addition to omitting decorrelation in such processing scenarios, it is advantageous to firstly downmix using the downmixer 1712 to an intermediate downmix, i.e., to a lower number of output channels which then results in a lower number of input channel for the binaural converter 1714. Exemplarily, 22.2 channel material is downmixed by the downmixer 1712 to a 5.1 intermediate downmix or, alternatively, the intermediate downmix is directly calculated by the SAOC decoder 1800 of FIG. 6 in a kind of a "shortcut" mode. Then, the binaural rendering only has to apply ten HRTFs (Head Related Transfer Functions) or BRIR functions for rendering the five individual channels at different positions in contrast to apply 44 HRTF for BRIR functions if the 22.2 input channels would have already been directly rendered. Specifically, the convolution operations for the binaural rendering may use a lot of processing power and, therefore, reducing this processing power while still obtaining an acceptable audio quality is particularly useful for mobile devices.

Advantageously, the "shortcut" as illustrated by control line 1727 comprises controlling the decoder 1300 to decode to a lower number of channels, i.e., skipping the complete OTT processing block in the decoder or a format converting to a lower number of channels and, as illustrated in FIG. 9, the binaural rendering is performed for the lower number of channels. The same processing can be applied not only for binaural processing but also for a format conversion as illustrated by line 1727 in FIG. 6.

In a further embodiment, an efficient interfacing between processing blocks may be used. Particularly in FIG. 6, the audio signal path between the different processing blocks is depicted. The binaural renderer 1710, the format converter 1720, the SAOC decoder 1800 and the USAC decoder 1300, in case SBR (spectral band replication) is applied, all operate in a QMF or hybrid QMF domain. In accordance with an embodiment, all these processing blocks provide a QMF or a hybrid QMF interface to allow passing audio signals between each other in the QMF domain in an efficient manner. Additionally, it is advantageous to implement the mixer module and the object renderer module to work in the QMF or hybrid QMF domain as well. As a consequence, separate QMF or hybrid QMF analysis and synthesis stages can be avoided which results in considerable complexity savings and then only a final QMF synthesis stage may be used for generating the loudspeakers indicated at 1730 or for generating the binaural data at the output of block 1710 or for generating the reproduction layout speaker signals at the output of block 1720.

Figure 11:
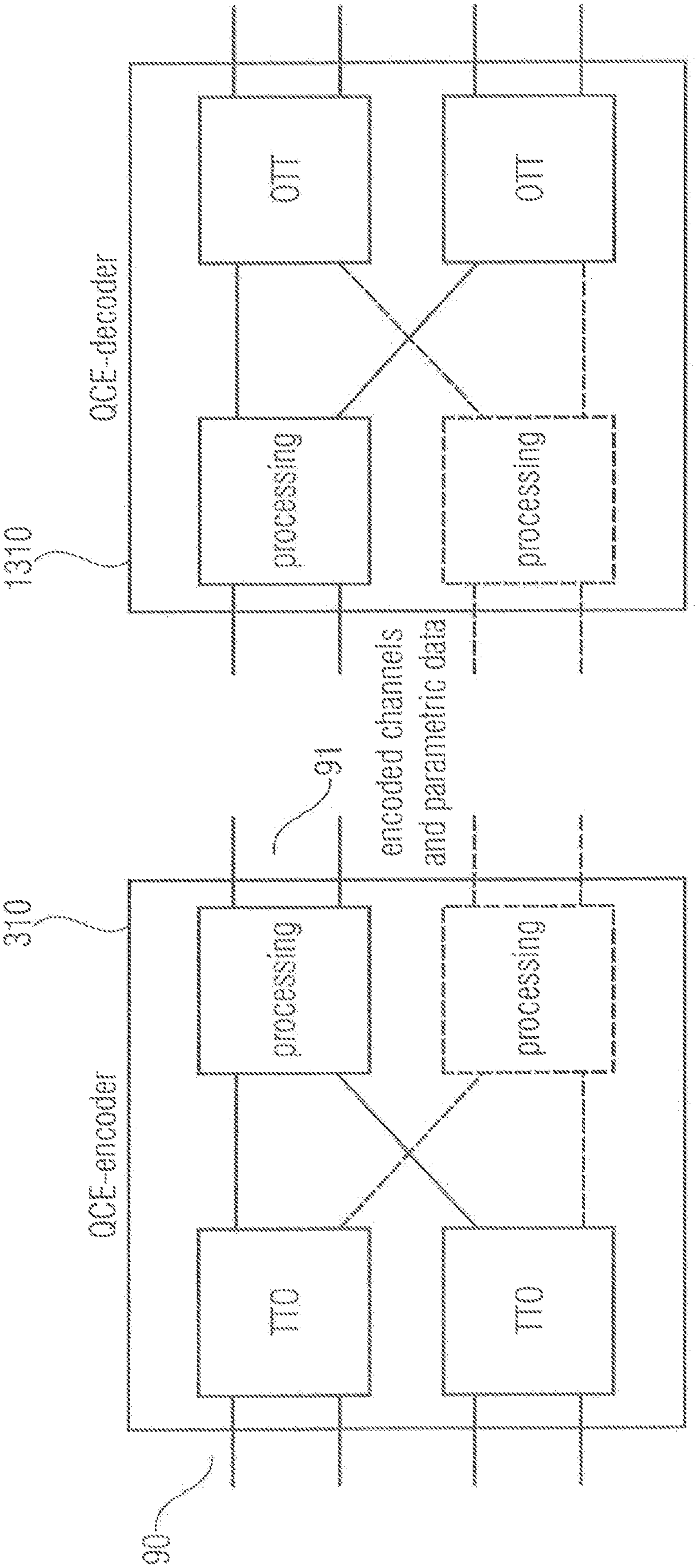
FIG. 11 illustrates a specific implementation of an encoder for processing a quad channel element (QCE) and the corresponding QCE decoder.

Subsequently, reference is made to FIG. 11 in order to explain quad channel elements (QCE). In contrast to a channel pair element as defined in the US AC-MPEG standard, a quad channel element may use four input channels 90 and outputs an encoded QCE element 91. In one embodiment, a hierarchy of two MPEG Surround boxes in 2-1-2 Mode or two TTO boxes (TTO=Two To One) boxes and additional joint stereo coding tools (e.g. MS-Stereo) as defined in MPEG USAC or MPEG surround are provided and the QCE element not only comprises two jointly stereo coded downmix channels and optionally two jointly stereo coded residual channels and, additionally, parametric data derived from the, for example, two TTO boxes. On the decoder side, a structure is applied where the joint stereo decoding of the two downmix channels and optionally of the two residual channels is applied and in a second stage with two OTT boxes the downmix and optional residual channels are upmixed to the four output channels. However, alternative processing operations for one QCE encoder can be applied instead of the hierarchical operation. Thus, in addition to the joint channel coding of a group of two channels, the core encoder/decoder additionally uses a joint channel coding of a group of four channels.

Furthermore, it is advantageous to perform an enhanced noise filling procedure to enable uncompromised full-band (18 kHz) coding at 1200 kbps.

The encoder has been operated in a 'constant rate with bit-reservoir' fashion, using a maximum of 6144 bits per channel as rate buffer for the dynamic data.

All additional payloads like SAOC data or object metadata have been passed through extension elements and have been considered in the encoder's rate control.

In order to take advantage of the SAOC functionalities also for 3D audio content, the following extensions to MPEG SAOC have been implemented:

- Downmix to arbitrary number of SAOC transport channels.
- Enhanced rendering to output configurations with high number of loudspeakers (up to 22.2).

The binaural renderer module produces a binaural downmix of the multichannel audio material, such that each input channel (excluding the LFE channels) is represented by a virtual sound source. The processing is conducted framewise in QMF domain.

The binauralization is based on measured binaural room impulse responses. The direct sound and early reflections are imprinted to the audio material via a convolutional approach in a pseudo-FFT domain using a fast convolution on-top of the QMF domain.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio decoder for decoding encoded audio data, comprising:

an input interface configured for receiving the encoded audio data, the encoded audio data comprising either a plurality of encoded audio channels and a plurality of encoded audio objects and compressed metadata related to the plurality of audio objects, or a plurality of encoded audio channels without any encoded audio objects, and a mode indication;

a core decoder configured for decoding the plurality of encoded audio channels received by the input interface and the plurality of encoded audio objects received by the input interface to acquire a plurality of decoded audio channels and a plurality of decoded audio objects, when the encoded audio data comprises the plurality of encoded audio channels and the plurality of encoded audio objects and the compressed metadata related to the plurality of encoded audio objects, or decoding the plurality of encoded audio channels received by the input interface to acquire a plurality of decoded audio channels, when the encoded audio data comprises the plurality of encoded audio channels without any encoded audio objects;

a metadata decompressor configured for decompressing the compressed metadata to acquire decompressed metadata, when the encoded audio data comprises the plurality of encoded audio channels and the plurality of encoded audio objects and the compressed metadata related to the plurality of encoded audio objects;

an object processor configured for processing the plurality of decoded audio objects using the decompressed metadata and the plurality of decoded audio channels to acquire a number of output audio channels comprising audio data from the plurality of decoded audio objects and the plurality of decoded audio channels, when the encoded audio data comprises the plurality of encoded audio channels and the plurality of encoded audio objects and the compressed metadata related to the plurality of encoded audio objects;

a mode controller connected to the input interface and configured for analyzing the encoded audio data to detect the mode indication indicating a first mode or a second mode, wherein, in the first mode, the encoded audio data comprise encoded audio channels and encoded audio objects, and wherein, in the second mode, the encoded audio data only comprise the plurality of encoded audio channels without any encoded audio objects; and a post-processor configured for converting the number of output audio channels into an output format, wherein the audio decoder, controlled by the mode controller, is configured to either bypass the object processor and to feed the plurality of decoded audio channels as the output audio channels into the post-processor, when the second mode has been detected by the mode controller, or to feed the plurality of decoded audio objects and the plurality of decoded audio channels into the object processor, when the first mode has been detected by the mode controller.

2. The audio decoder of claim 1, wherein the post-processor is configured to convert the number of output audio channels to a binaural representation as the output format or to a reproduction format as the output format, the reproduction format comprising a smaller number of audio channels than the number of output audio channels, and wherein the audio decoder is configured to control the post-processor in accordance with a control input derived from a user interface or extracted from the encoded audio data.

3. The audio decoder of claim 1, in which the object processor comprises:

an object renderer for rendering the decoded audio objects to acquire rendered audio objects using the decompressed metadata; and a mixer for mixing the rendered audio objects and the decoded audio channels to acquire the number of output audio channels.

4. The audio decoder of claim 1, wherein the object processor comprises:

a spatial audio object coding decoder for decoding one or more transport channels and associated parametric side information representing encoded audio objects, wherein the spatial audio object coding decoder is configured to render the decoded audio objects in accordance with rendering information related to a placement of the decoded audio objects to acquire rendered audio objects and to control the object processor to mix the rendered audio objects and the decoded audio channels to acquire the number of output audio channels.

5. The audio decoder of claim 1, wherein the object processor comprises a spatial audio object coding decoder for decoding one or more transport channels and associated parametric side information representing one or more encoded audio objects of the plurality of encoded audio objects and one or more encoded audio channels of the plurality of encoded audio channels, wherein the spatial audio object coding decoder is configured to decode the one or more encoded audio objects and the one or more encoded audio channels using the one or more transport channels and the parametric side information to obtain one or more decoded audio objects and one or more decoded audio channels, and wherein the object processor is configured to render the one or more decoded audio objects using the decompressed metadata to acquire one or more rendered audio objects and to decode the one or more decoded audio channels and to mix the one or more decoded audio channels with the one or more rendered audio objects to acquire the number of output audio channels.

6. The audio decoder of claim 1, wherein the object processor comprises a spatial audio object coding decoder for decoding one or more transport channels and associated parametric side information representing encoded audio objects or encoded audio channels, wherein the spatial audio object coding decoder is configured to transcode the associated parametric information and the decompressed metadata into transcoded parametric side information usable for directly rendering the output format, and wherein the post-processor is configured for calculating audio channels of the output format using the decoded transport channels and the transcoded parametric side information, or wherein the spatial audio object coding decoder is configured to directly upmix and render channel signals for the output format using the decoded transport channels and the parametric side information.

7. The audio decoder of claim 1, wherein the object processor comprises a spatial audio object coding decoder for decoding one or more transport channels output by the core decoder and associated parametric data and decompressed metadata to acquire a plurality of rendered audio objects, wherein the object processor comprises an object renderer being configured to render the decoded audio objects output by the core decoder to acquire rendered decoded audio objects;

wherein the object processor is furthermore configured to mix the rendered decoded audio objects and the plurality of rendered audio objects with the decoded audio channels, wherein the audio decoder further comprises an output interface for outputting an output of the mixer to loudspeakers, wherein the post-processor furthermore comprises:

a binaural renderer for rendering the output audio channels into two binaural channels using head related transfer functions or binaural impulse responses, the two binaural channels representing the binaural representation, and a format converter for converting the output audio channels into the output format comprising a lower number of audio channels than the output audio channels of the mixer using information on a reproduction layout.

8. The audio decoder of claim 1, wherein the plurality of encoded audio channels or the plurality of encoded audio objects are encoded as channel pair elements, single channel elements, low frequency elements or quad channel elements, wherein a quad channel element comprises four original audio channels or audio objects, and wherein the core decoder is configured to decode the channel pair elements, the single channel elements, the low frequency elements or the quad channel elements in accordance with side information comprised by the encoded audio data indicating a channel pair element, a single channel element, a low frequency element or a quad channel element.

9. The audio decoder of claim 1, wherein the core decoder is configured to apply full-band decoding operation using a noise filling operation.

10. The audio decoder of claim 1, wherein elements comprising the binaural renderer, the format converter, the mixer, the SAOC decoder and the core decoder and the object renderer operate in a quadrature mirror filterbank (QMF) domain and wherein quadrature mirror filter domain data is transmitted from one of the elements to another of the elements without any synthesis filterbank and subsequent analysis filterbank processing.

11. The audio decoder of claim 1, wherein the post-processor is configured to downmix the number of output audio channels output by the object processor to a format comprising three or more audio channels and comprising less audio channels than the number of output audio channels output by the object processor to acquire channels of an intermediate downmix, and to binaurally render the channels of the intermediate downmix into the binaural representation comprising a two-channel binaural output signal.

12. The audio decoder of claim 1, in which the post-processor comprises:

a controlled downmixer for applying a downmix matrix; and a controller for determining a specific downmix matrix using information on a channel configuration of an output of the object processor and information on an intended reproduction layout.

13. The audio decoder of claim 1, in which the core decoder or the object processor are controllable, and in which the post-processor is configured to control the core decoder or the object processor in accordance with information on the output format so that a rendering incurring decorrelation processing of audio objects or audio channels not occurring as separate audio channels in the output format is reduced or eliminated, or so that for audio objects or audio channels not occurring as the separate audio channels in the output format, upmixing or decoding operations are performed as if the audio objects or the audio channels would occur as the separate audio channels in the output format, except that any decorrelation processing for the audio objects or the audio channels not occurring as the separate audio channels in the output format is deactivated.

14. The audio decoder of claim 1, in which the core decoder is configured to perform transform decoding and a spectral band replication decoding for the single channel elements, and to perform the transform decoding, parametric stereo decoding and the spectral band reproduction decoding for the channel pair elements and the quad channel elements.

15. A method of decoding encoded audio data, comprising:

receiving the encoded audio data, the encoded audio data comprising either a plurality of encoded audio channels and a plurality of encoded audio objects and compressed metadata related to the plurality of audio objects, or a plurality of encoded audio channels without any encoded audio objects, and a mode indication;

core decoding the encoded audio data to acquire a plurality of decoded audio channels and a plurality of decoded audio objects, when the encoded audio data comprises the plurality of encoded audio channels and the plurality of encoded audio objects and the compressed metadata related to the plurality of encoded audio objects, or the plurality of encoded audio channels to acquire a plurality of decoded audio channels, when the encoded audio data comprises the plurality of encoded audio channels without any encoded audio objects;

decompressing the compressed metadata to acquire decompressed metadata, when the encoded audio data comprises the plurality of encoded audio channels and the plurality of encoded audio objects and the compressed metadata related to the plurality of encoded audio objects, processing the plurality of decoded audio objects using the decompressed metadata, and the plurality of decoded audio channels to acquire a number of output audio channels comprising audio data from the plurality of decoded audio objects and the plurality of decoded audio channels, when the encoded audio data comprises the plurality of encoded audio channels and the plurality of encoded audio objects and the compressed metadata related to the plurality of encoded audio objects;

analyzing, by a mode controller, the encoded audio data to detect a mode indication indicating a first mode or a second mode, wherein, in the first mode, the encoded audio data comprise encoded audio channels and encoded audio objects, and wherein, in the second mode, the encoded audio data only comprise the plurality of encoded audio channels without any encoded audio objects; and converting the number of output audio channels into an output format, wherein, in the method of decoding the encoded audio data, and controlled by the mode controller, either the processing the plurality of decoded audio objects is bypassed and the plurality of decoded audio channels acquired by the core decoding is fed, as the output audio channels, into the converting, when the second mode has been detected by the mode controller, or the plurality of decoded audio objects and the plurality of decoded audio channels acquired by the core decoding are fed into the processing the plurality of decoded audio objects, when the first mode has been detected by the mode controller.

16. A non-transitory digital storage medium having stored thereon a computer program for performing a method of decoding encoded audio data, comprising:

receiving the encoded audio data, the encoded audio data comprising either a plurality of encoded audio channels and a plurality of encoded audio objects and compressed metadata related to the plurality of audio objects, or a plurality of encoded audio channels without any encoded audio objects, and a mode indication;

core decoding the encoded audio data to acquire a plurality of decoded audio channels and a plurality of decoded audio objects, when the encoded audio data comprises the plurality of encoded audio channels and the plurality of encoded audio objects and the compressed metadata related to the plurality of encoded audio objects, or the plurality of encoded audio channels to acquire a plurality of decoded audio channels, when the encoded audio data comprises the plurality of encoded audio channels without any encoded audio objects;

decompressing the compressed metadata to acquire decompressed metadata, when the encoded audio data comprises the plurality of encoded audio channels and the plurality of encoded audio objects and the compressed metadata related to the plurality of encoded audio objects, analyzing, by a mode controller, the encoded audio data to detect a mode indication indicating a first mode or a second mode, wherein, in the first mode, the encoded audio data comprise encoded audio channels and encoded audio objects, and wherein, in the second mode, the encoded audio data only comprise the plurality of encoded audio channels without any encoded audio objects;

processing the plurality of decoded audio objects using the decompressed metadata, and the plurality of decoded audio channels to acquire a number of output audio channels comprising audio data from the plurality of decoded audio objects and the plurality of decoded audio channels, when the encoded audio data comprises the plurality of encoded audio channels and the plurality of encoded audio objects and the compressed metadata related to the plurality of encoded audio objects; and converting the number of output audio channels into an output format, wherein, in the method of decoding the encoded audio data, and controlled by the mode controller:

either the processing the plurality of decoded audio objects is bypassed and the plurality of decoded audio channels acquired by the core decoding is fed, as the output audio channels, into the converting, when the second mode has been detected by the mode controller, or the plurality of decoded audio objects and the plurality of decoded audio channels acquired by the core decoding are fed into the processing the plurality of decoded audio objects, when the first mode has been detected by the mode controller, when said computer program is run by a computer.

* * * * *